United States Patent [19]
Hoshino

[11] Patent Number: 5,363,218
[45] Date of Patent: * Nov. 8, 1994

[54] COLOR ESTIMATION METHOD FOR COMPRESSING COLOR IMAGE DATA FOR IMAGE REPRODUCTION

[75] Inventor: Toru Hoshino, Hino, Japan

[73] Assignee: Konica Corporation, Tokyo, Japan

[ * ] Notice: The portion of the term of this patent subsequent to May 31, 2011 has been disclaimed.

[21] Appl. No.: 796,241

[22] Filed: Nov. 22, 1991

[30] Foreign Application Priority Data

Nov. 26, 1990 [JP] Japan .................................. 2-321685
Nov. 26, 1990 [JP] Japan .................................. 2-321686

[51] Int. Cl.$^5$ .......................... H04N 1/46; G03F 3/08
[52] U.S. Cl. ............................ 358/518; 358/501; 358/515; 358/523; 358/530
[58] Field of Search .................... 358/80, 78, 500, 501, 358/504, 505, 515, 521, 523, 530, 539

[56] References Cited

U.S. PATENT DOCUMENTS

| | | | |
|---|---|---|---|
| 4,758,885 | 7/1988 | Sasaki et al. | 358/80 |
| 4,786,974 | 11/1988 | Ina | 358/426 |
| 4,954,912 | 9/1990 | MacDonald et al. | 358/530 |
| 4,959,711 | 7/1990 | Hung et al. | 358/80 |
| 5,089,884 | 2/1992 | Suzuki et al. | 358/80 |
| 5,121,196 | 6/1992 | Hung | 358/80 |

*Primary Examiner*—Edward L. Coles, Sr.
*Assistant Examiner*—Kimberly A. Williams
*Attorney, Agent, or Firm*—Finnegan, Henderson, Farabow, Garrett & Dunner

[57] ABSTRACT

The invention provides a method of transforming a color image data of a first media (color CRT) so as to be reproduced by a second media (color hardcopy), the color reproducing capability of which is smaller than that of the first media. The chroma of color image data "T" is compared with a threshold value which is "a" (a<1.0) times of the maximum chroma of the second color gamut of the second media at the lightness "LT" and the hue "θT" of the color image data "T". The chroma "rT" is compressed in accordance with the comparison result without changing the hue "θT".

10 Claims, 14 Drawing Sheets

COLOR MASKING DEVICE

COLOR GAMUT OF COLOR CRT

COLOR GAMUT OF PRINTING

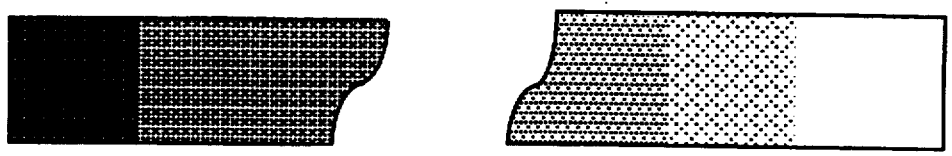
|     |    |    |     |     |
|-----|----|----|-----|-----|
| L*  | 20 | 25 | 95  | 100 |
| u*  | 0  | 0  | 0   | 0   |
| v*  | 0  | 0  | 0   | 0   |
GRAY WEDGE TARGET PATCHES
F I G. 3

TARGET COLOR
ON Y-M COORDINATE SYSTEM

PROVIDING TARGET VALUE T'

COLORIMETRIC SYSTEM INDICATING LIGHTNESS AND CHROMA

Y-M COORDINATE SYSTEM

EXPLANATION FOR
COMPRESSING AND MAPPING

RELATION BETWEEN
HUE ANGLE AND u* v* AXES

CHANGE IN CONDITION
OF LINE IN EXAMPLE 2

CHANGE IN CONDITION
OF LINE IN EXAMPLE 1

CHANGE IN CONDITION
OF LINE IN EXAMPLE 3

EXPLANATION FOR
INTERPOLATION PROCESS (CUBIC)

EXPLANATION FOR INTERPOLATION
PROCESS (TRIANGULAR PYRAMID)

TRIANGULAR PYRAMID T AT P (5.1.2)

TRIANGULAR PYRAMID T AT P (3.1.5)

COLOR MASKING DEVICE

AN EXAMPLE OF COMPRESSION OF COLOR REPRODUCTION GAMUT

COLOR ESTIMATION METHOD FOR COMPRESSING COLOR IMAGE DATA FOR IMAGE REPRODUCTION

The present invention relates to a color estimation method which is suited to a color component image correction device which is used so as to reproduce, for example, a color CRT as a color hard copy.

When a color CRT is reproduced as a color hard copy, colorimetric systems are different from each other. A color CRT is formed through an additive color mixing in which a phosphor RGB colorimetric system is used as the color representation system. On the other hand, a color hard copy is formed through a subtractive color mixing in which, for example, a YMC coordinate system, is used as the colorimetric system. In this case, the image data is converted or the colors are corrected between these colorimetric systems.

When a color CRT is reproduced as a hard copy, for example, red (R), green (G), and blue (B) image data ere supplied to a color masking device 10 as shown in FIG. 21, yellow (Y), magenta (M), and cyan (C) image data (color correction data) are outputted from the color masking device 10, and the color correction data is supplied to a color printer 100.

It is possible to refer to the lookup table so as to obtain color correction data from R, G, and B image data. As a method for obtaining color correction data to be stored in this lookup table, a method, for example, indicated in Japanese Patent Application Laid-Open No. 1988-254864 is proposed.

Color patches of combinations of R, G, and B image data of color CRT are displayed on the display device and measured colorimetrically so as to obtain the values of the colorimetric system. Simultaneously, color patches of combinations of Y, M, and C image data of a color hard copy are outputted and measured colorimetrically so as to obtain the values of the same colorimetric system as that of color CRT. Using the values of the colorimetric system obtained by measuring the color patches of the color hard copy a combination of Y, M, and C image data of a color hard copy is obtained by an interpolation operation so as to obtain the same as or close to the value of the colorimetric system obtained by measuring the color patches of combinations of R, G, and B image data of the color CRT on the display.

The color reproduction gamut by R, G, and B image data of color CRT is generally wider than the color reproduction gamut by Y, M, and C image data of a color hard copy.

Therefore, when selecting Y, M, and C image data which have a corresponding value substantially equal to the values of the R, G, and B image data on the colorimetric system Y, M, and C image data corresponding to input RGB image data are not found in the area beyond the color reproduction gamut color hard copy.

To eliminate such a defect, it is required to compress the color reproduction gamut of R, G, and B image data of the color CRT so as to match the color reproduction gamut by Y, M, and C image data of the color hard copy.

As a conventional example, a method for compressing the color reproduction gamut by moving or shifting it in the direction of the lightness axis with the hue fixed is KAW indicated in Japanese Patent Application Laid-Open No. 1988-254889.

How to change the lightness values and the chroma values for conversion movement is important because it affects the conversion result greatly. In the above patent, however, no concrete description on this point is provided and a most suitable method for obtaining a natural conversion result is not indicated.

For example, in the conventional method KAW for moving chroma in the direction of the lightness axis with the hue fixed, there are problems imposed such that the movement distance is determined according to the external form of the color gamut, and the hue is always fixed and the chroma is unbalanced with this movement.

In FIG. 22, a solid line "a" indicates the color reproduction gamut of color CRT and a solid line "b" indicates the color reproduction gamut of a hard copy. When values x and y in the color reproduction gamut of CRT are moved to values x' and y' in the color reproduction gamut of a hard copy, the difference in chroma values between x' and y' becomes much smaller than that between x and y, and these chroma values become unbalanced.

When a color CRT of the three primary colors or three primary colors R, G, and B is reproduced as a color hard copy of the three primary colors Y, M, and C, chroma values of the three colors R, G, and B among the six colors R, G, B, Y, M, and C are apt to be high in the color CRT, while the chroma values of the three colors Y, M, and C among the six colors R, G, B, Y, M, and C are apt to be high in the color hard copy. As a result, when, for example, the blue with a high chroma value of a color CRT is moved into the color reproduction gamut of a hard copy with the hue fixed, the chroma value decreases remarkably. There is a problem, like this, that for a color with a high chroma on a color CRT, the chroma decreases greatly and the balance of chroma values between the entire colors is changed after movement.

The object of the present invention is to provide a method, for example for reproducing a color CRT as a color hard copy so that the balance of chroma values between the entire colors is not changed and the lightness and chroma are kept satisfactory.

SUMMARY OF THE INVENTION

In the first invention of the color estimation method of the present invention, the values of the colorimetric system for each combination of a plurality of input color component image information is obtained and the values of the colorimetric system for each combination of a plurality of output color component image information is obtained.

A CIE standard L*u*v* or L*a*b* colorimetric system is used as a colorimetric system.

L* among the values of the colorimetric system obtained for an optional combination of the input color component image information is converted according to the ratio of the difference between the maximum and minimum values of the lightness of the input side color gamut on the lightness axis which comprise the value of the colorimetric system obtained for each combination of the input color component image information to the difference between the maximum and minimum values of the lightness of the output side color gamut on the lightness axis which comprise the value of the colorimetric system obtained for each combination of the output color component image information.

u* and v* or a* and b* among the values of the colorimetric system obtained for an optional combination of the input color component image information are not corrected when the chroma is smaller than a value which is "a" (a<1.0) times of the maximum chroma value at the hue and lightness of the output side color gamut. When the chroma is larger than the value which is "a" times of the maximum chroma value, u* and v* or a* and b* are converted so that the hue is fixed and the chroma is converted according to the ratio of the difference between the maximum chroma value at the hue and lightness of the input side color gamut and the value which is "a" times of the maximum chroma value at the hue and lightness of the output side color gamut to the difference between the maximum chroma value at the hue and lightness of the output side color solid and a value which is "a" times of that maximum chroma value.

Using the value of the colorimetric system obtained for each combination of a plurality of output color component image information, a combination of the output color component image information, which has the value of the converted colorimetric system is obtained.

In the second invention, u* and v* or a* and b* among the values of the colorimetric system obtained for an optional combination of the input color component image information are not corrected when the chroma is smaller than a value which is "a" (a<1.0) times of the maximum chroma value of the output side color gamut on a straight line passing the lightness and the chroma at the hue. When the chroma is larger than the above mentioned value which is "a" times of the maximum chroma value of the output side color gamut on the above straight line, u* and v* or a* and b* are converted so that, while the hue is fixed, the chroma is converted according to the ratio of the difference between the maximum chroma value on the above straight line in the input side color gamut and the above mentioned value which is "a" times of the maximum chroma on the above straight line in the output side color gamut to the difference between the maximum chroma value on the above straight line in the output side color gamut and the above mentioned value which is "a" times of that maximum chroma.

Furthermore, when the chroma is converted within a predetermined lightness scope, L* is converted according to the conversion amount of chroma.

At least in an area with a high lightness, the L* value is converted according to the conversion amount of chroma so as to decrease the lightness as the chroma decreases.

In these invention, CIE standard L*u*v* or L*a*b* colorimetric system is used as a colorimetric system.

In the first invention, as to the lightness direction, L* among the values of the colorimetric system obtained for each combination of the input color component image information is converted according to the ratio of the lightness range of the input side color gamut on the lightness axis to that of the output side color gamut, and the lightness of the input side color gamut is compressed and mapped.

As to the chroma direction, no value is corrected at the overlapped center portion between the color reproduction gamut of the input side and that of the output side. In the peripheral area, u* and v* or a* and b* among the values of the colorimetric system obtained for each combination of the input color component image information are converted according to the difference of the chroma range between the two color gamuts and the chroma of the input side color gamut is compressed and mapped.

By doing this, the color reproduction scope on the input side is included in the color reproduction gamut on the output side by a natural conversion result, and the color reproduction obtained by the output color component image information becomes natural.

In the second invention, furthermore, for example, the chroma in a high lightness area is compressed so that the lightness decreases as the chroma decreases, and when u* and v* or a* and b* are converted and the chroma is compressed and mapped, the decrease amount of chroma is suppressed.

By doing this, decreases in color saturation by compression and mapping, for example, in a high lightness and a high chroma area can be lowered.

In the third invention, u* and v* or a* and b* among the values of the colorimetric system obtained for an optional combination of the input color component image information are not corrected when the chroma is smaller than a value which is "a" (a<1.0) times of the maximum chroma value at the hue and lightness of the output side color gamut. When the chroma is larger than the value which is "a" times of the maximum chroma value, u* and v* or a* and b* are converted so that to the area enclosed with the inner color gamut surface which comprises the value which is "a" times of the maximum chroma value at each hue and lightness in the output side color gamut and the inner surface of the output side color gamut which comprises the maximum chroma value at each hue and lightness in the output side color gamut, the entire area enclosed with the above metnioned inner surface of the output side color gamut and the inner surface of the input side color gamut which comprises the maximum chroma value at each hue and lightness in the input side color gamut corresponds continuously.

As a correspondence method, when the chroma decreases and when the hue, which is obtained by an optional combination of the input color component image information, is within a predetermined area of one of the maximum chroma points of the three primary colors of these six, blue, green, red, yellow, magenta, and cyan of the input side color gamut, the hue is moved toward the maximum chroma point of the corresponding color of the output side color gamut as the chroma decreases.

In the fourth invention, as another correspondence method in the third invention, in case that three primary colors of input color component information differ from that of output color when the hue, which is obtained by an optional combination of the input color component image information, is within a predetermined area of one of the maximum chroma points of the three primary colors of the input side color gamut, the hue is moved toward one of two hues, which are short distance from the above mentioned hue, at the maximum chroma points of the three primary colors of the output side color gamut.

In the third invention, when the chroma of the input side color gamut is compressed and mapped, the hue is moved so that the peak of each color of the input side color gamut moves toward the peak of the corresponding color of the output side color gamut.

By doing this, the color reproduction gamut on the input side is included in the color reproduction scope on the output side by natural conversion with the entire chroma balance side is included in the color reproduction gamut on the output side by natural conversion with the entire chroma balance kept, the color reproduction obtained by the output color component image information provides satisfactory lightness and chroma, and the chroma is well balanced as a whole.

In the fourth invention, when the three primary colors of the input color component image information, for example, R, G, and B are different from the three primary colors of the output color component image information, for example, Y, M, and C and the chroma of the input side color gamut is compressed and mapped, the hue is moved so that the peaks of the three primary colors of the input side color gamut is moved to the peaks of the three primary colors of the output side color gamut.

By doing this, although the hue is moved, the entire chroma balance is kept.

BRIEF DESCRIPTION OF THE DRAWINGS

FIG. 3 shows a gray wedge target patches.

DETAILED DESCRIPTION OF THE PREFERRED EMBODIMENTS

Figure 1:
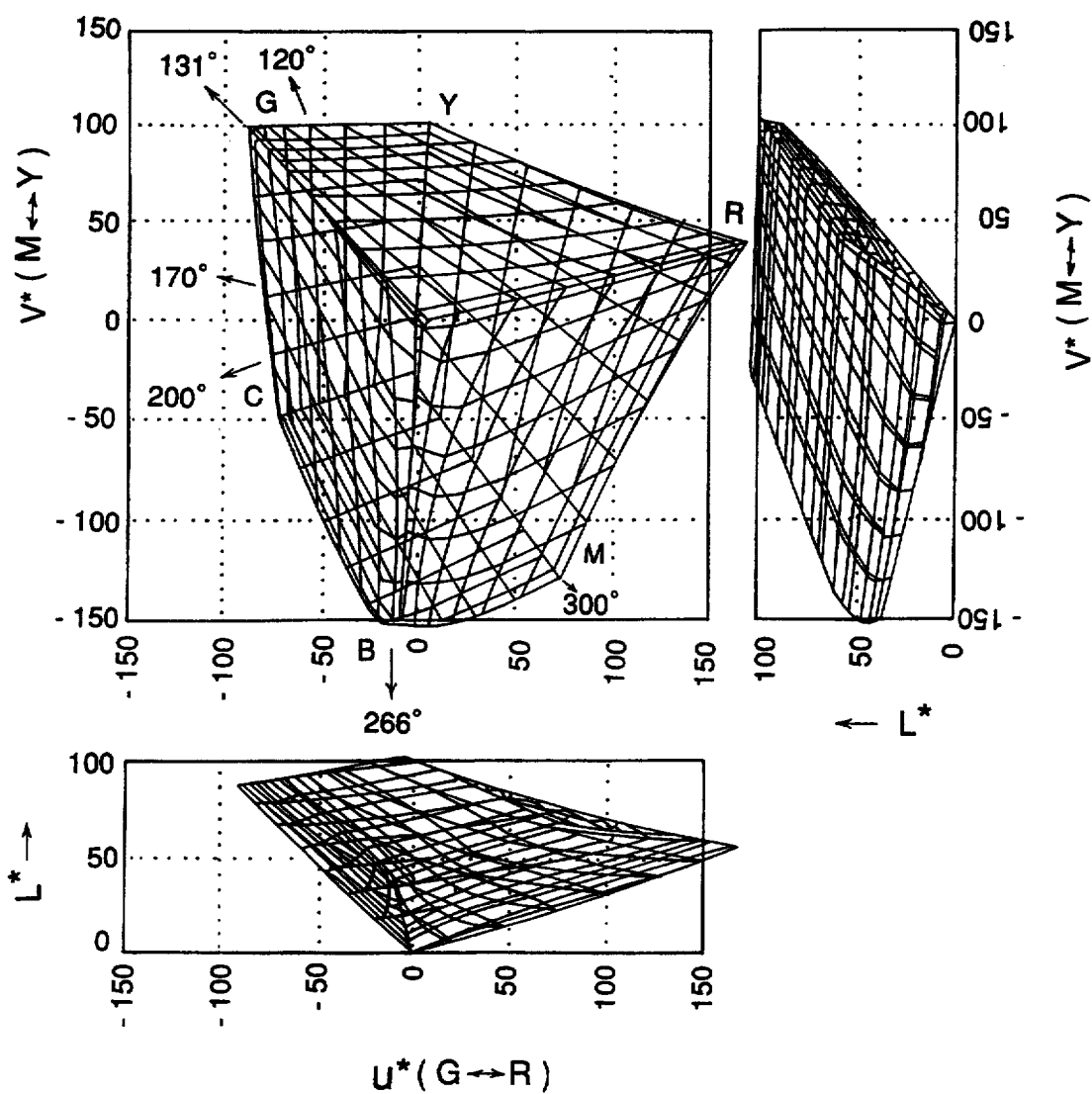
FIG. 1 shows a color gamut of the color CRT on the CIE standard L*u*v* colorimetric system.

An embodiment of the present invention will be described hereunder with reference to the accompanying drawings. In this embodiment, combinations of image data of Y, M, C, and K (black) for reproducing reproduced colors by each combination of R, G, and B image data on the color CRT, for example, by color printing are obtained.

It is assumed that the values of R, G, B, Y, M, C, and K range from 0 to 255.

(1) Firstly, a color patch by each combination of R, G, and B image data is displayed on the color CRT device and measured colorimetrically, and the values of the XYZ colorimetric system are obtained and then the values of the L*u*v* colorimetric system are obtained.

In this case, for example, by using a device which writes R, G, and B image data into a frame memory of 8-bit R, G, and B, which is connected to the color CRT device, by a computer and displays the colors on the color CRT device, the values of the XYZ colorimetric system are obtained by Method 1 or Method 2 which will be described hereunder.

Method 1

Five quantization levels of 0, 64, 128, 192, and 255 are provided for each of R, G, and B image data. A computer is operated so that the colors of combinations of the levels ($5\times5\times5=125$) are displayed one by one on the color CRT device, each color is colorimetrically measured by a spectral radiometer, and the values of the XYZ colorimetric system are obtained.

The intermediate levels of the $5\times5\times5=125$ color data are interpolated and the number of color data is increased to $9\times9\times9=729$. The 729 colors may be measured colorimetrically, though the measurement count is so large.

Method 2

The values of the XYZ colorimetric system may be calculated by using the basic expression indicated below, which is well known as a color CRT color reproduction expression.

$$\begin{pmatrix}X\\Y\\Z\end{pmatrix}=\begin{pmatrix}XR\,XG\,XB\\YR\,YG\,YB\\ZR\,ZG\,ZB\end{pmatrix}\begin{pmatrix}(R/255)\ \gamma\\(G/255)\ \gamma\\(B/255)\ \gamma\end{pmatrix}$$

The coefficients XR, XG, XB, YR, YG, YB, ZR, ZG, ZB, and gamma are determined according to the characteristics of the CRT device used. 10 to 20 points are taken from the quantization levels 0 to 255 for each monochrome of R, G, and B, the colors, which are displayed on the color CRT device using the values, are measured colorimetrically by the spectral radiometer so as to obtain the X, Y, and Z values, and each coefficient is obtained from the relation between the R, G, and B values and the X, Y, and Z values.

By doing this, the values of the XYZ colorimetric system are obtained for each of the $9\times9\times9=729$ colors by Method 1 or Method 2. The values of the L*u*V* colorimetric system are calculated from the values of the XYZ colorimetric system. The relation between x and y and X, Y, and Z is as follows:

$$x=X/(X+Y+Z),\ y=Y/(X+Y+Z)$$

The values of x and y of D65 are $x=0.3127$ and $y=0.3290$. Therefore, Xn, Yn, and Zn satisfy the following expressions.

$$Xn/(Xn+Yn+Zn)=0.3127$$

$$Yn/(Xn+Yn+Zn)=0.3290$$

It is necessary to determine the levels of the absolute values of Xn, Yn, and Zn. To match the levels with the levels of the measured values of X, Y, and Z, the value of Yn is made nearly equal to the value of Y among X, Y, and Z when white ($R=G=B=255$) is displayed.

By doing this, the values of the L*u*v* colorimetric system can be obtained for the $9\times9\times9=729$ colors of R, G, and B image data. The L*u*v* colorimetric system values are defined as follows:

L* TV1 (R, G, B)

u* TV1 (R, G, B)

v* TV1 (R, G, B)

FIG. 1 shows these values on the L*u*v* colorimetric system. Hereinafter, these values are called the CRT color gamut.

(2) Next, a color patch by each combination of Y, M, and C image data is measured colorimetrically, and the values of the XYZ colorimetric system are obtained and then the values of the L*u*v* colorimetric system are obtained.

In this case, five quantization levels of 0, 64, 128, 192, and 255 are provided for each of Y, M, and C image data, and color patches of each combination of the levels (5×5×5=125) are produced.

K image data is obtained from the following relation equation for each combination of Y, M, and C image data, and black K in the amount is added to the color patches of the Y, M, and C image data.

$$K = 1.6 \ (\min. [Y, M, C] - 128) \qquad (1)$$

where K=0 when K<0.

Data is actually printed by the normal printing plate printing process that 4 images of Y, M, C, and K:

Y (5×5×5)

M (5×5×5)

C (5×5×5)

K (5×5×5)

are outputted to 4 monochromatic films by a scanner, 4 printing plates of Y, M, C, and K are exposed through each films, and the printed matter of 5×5×5=125 color patches are printed.

The color patches are measured by a spectrophotometer, the values of the XYZ colorimetric system are determined, and the values of the L*u*v* colorimetric system are calculated.

The intermediate levels of the 5×5×5=125 color data are interpolated and the number of color data is increased to 9×9×9=729. The 729 colors may be printed and measured colorimetrically, though the measurement count is so large.

By doing this, the values of the L*u*v* colorimetric system are obtained for the 9×9×9=729 colors of Y, M, C, and K image data. The values of the L*u*v* colorimetric system are defined as:

L* IN (Y, M, C)

u* IN (Y, M, C)

v* IN (Y, M, C)

Figure 2:
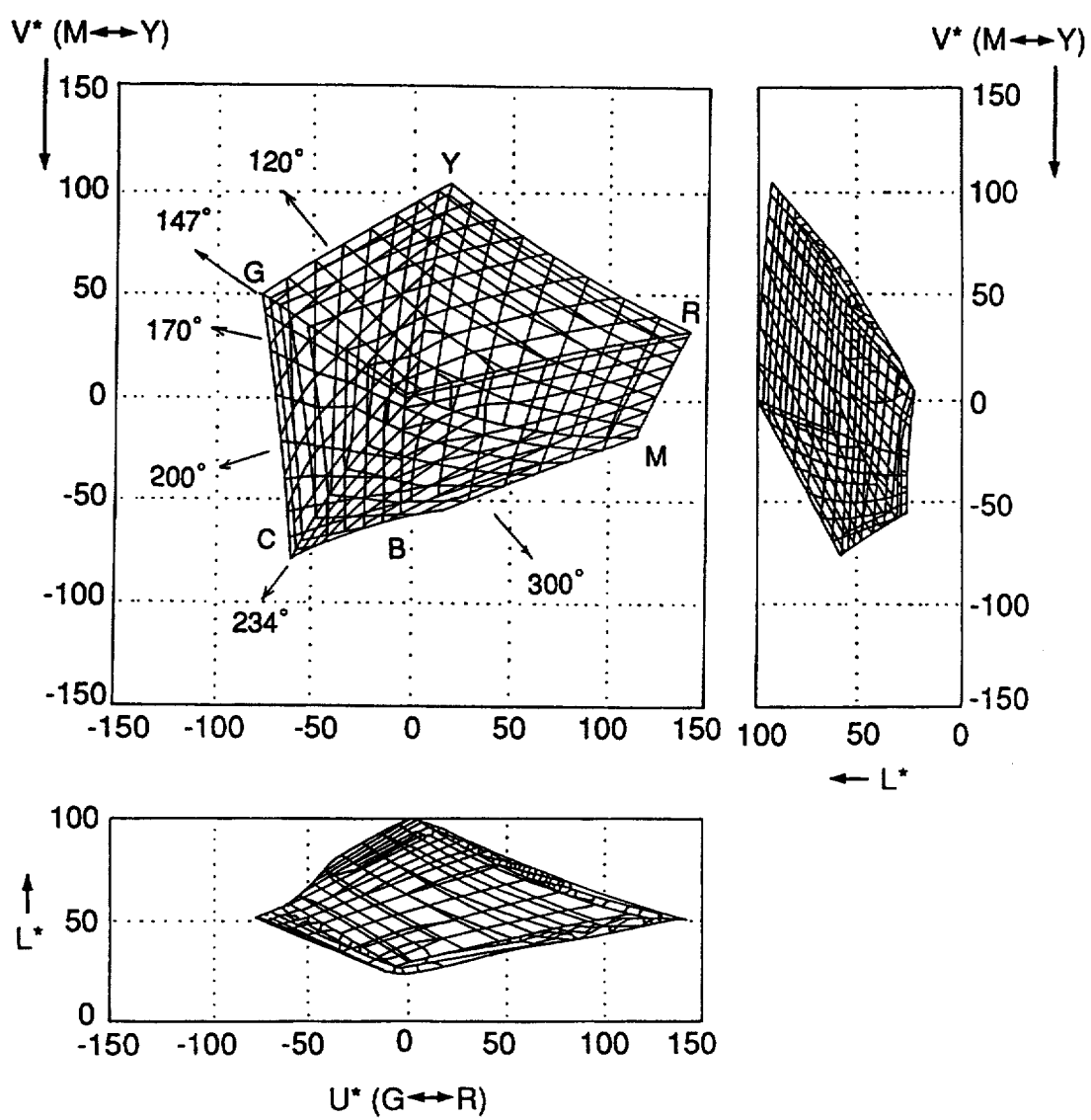
FIG. 2 shows a color gamut of a printing on the CIE standard L*u*v* colorimetric system.

FIG. 2 shows these values on the L*u*v* colorimetric system. Hereinafter, these values are called the printed matter color gamut.

(3) Next, the maximum and minimum values of L* are obtained from the color CRT color gamut.

In this case, a combination wherein the value of L* is maximum among the 9×9×9=729 colors and a combination wherein the value of L* is minimum are obtained and the value of L* at that time is obtained.

Maximum Value

The value of L* when white is displayed under the condition of R=G=B=255 is defined as L* TV1max.

Minimum Value

The value of L* when black is displayed under the condition of R=G=B=0 is defined as L* TV1min.

(4) Next, the maximum and minimum values of L* are obtained from the printed matter color gamut.

In this case, a combination wherein the value of L* is maximum among the 9×9×9=729 colors and a combination wherein the value of L* is minimum are obtained and the value of L* at that time is obtained.

Maximum value

The L* value of white background on paper stork under the condition of Y=M=C=0 (K=0) is defined a L*INmax.

Minimum value

The value of L* when black is printed under the condition of Y=M=C=255 (K=203) is defined as L*INmin.

(5) Next, each value of the color CRT color gamut values L* TV1, u* TV1, and v* TV1 are converted to L* TV2, u* TV2, and v* TV2.

L* is converted linearly by the following expression so that the maximum and minimum values of L* of the color CRT color gamut are equal to the maximum and minimum values of L* of the printed matter color gamut.

$$L^*TV2 = \left( \frac{L^*INmax - L^*INmin}{L^*TV1max - L^*TV1min} \right) \times$$

$$(L^*TV1 - L^*TV1min) + L^*INmin$$

u* and v* are converted by the following expressions in the same way.

$$u^*TV2 = \frac{L^*TV2}{L^*TV1} u^*TV1$$

$$v^*TV2 = \frac{L^*TV2}{L^*TV1} v^*TV1$$

(6) Next, a printed matter of a gray wedge target wherein the values of L* are at even intervals is provided.

A gray wedge target wherein u* and v* are 0 and L* ranges from 20 to 100 at intervals of five quantization levels is provided (see FIG. 3).

In this case, using the values of L* IN(Y, M, C), u* IN(Y, M, C), and v* IN(Y, M, C) of the printed matter color gamut, the values of Y, M, and C at each step of the wedge target chart are obtained by the convergence operation.

Next, the convergence operation will be described. The color gamut value at each step of the gray wedge target is given in the printed matter color gamut (shown in FIG. 2) as a target value T'.

For simplicity, two basic colors (for example, Y and M) are used for description.

Figure 4:
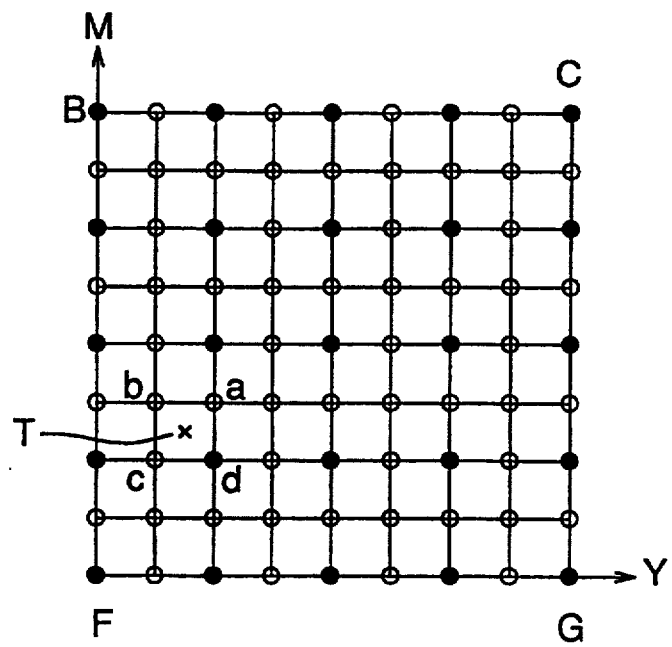
FIG. 4 shows a target color on the Y-M coordinate system.
Figure 5:
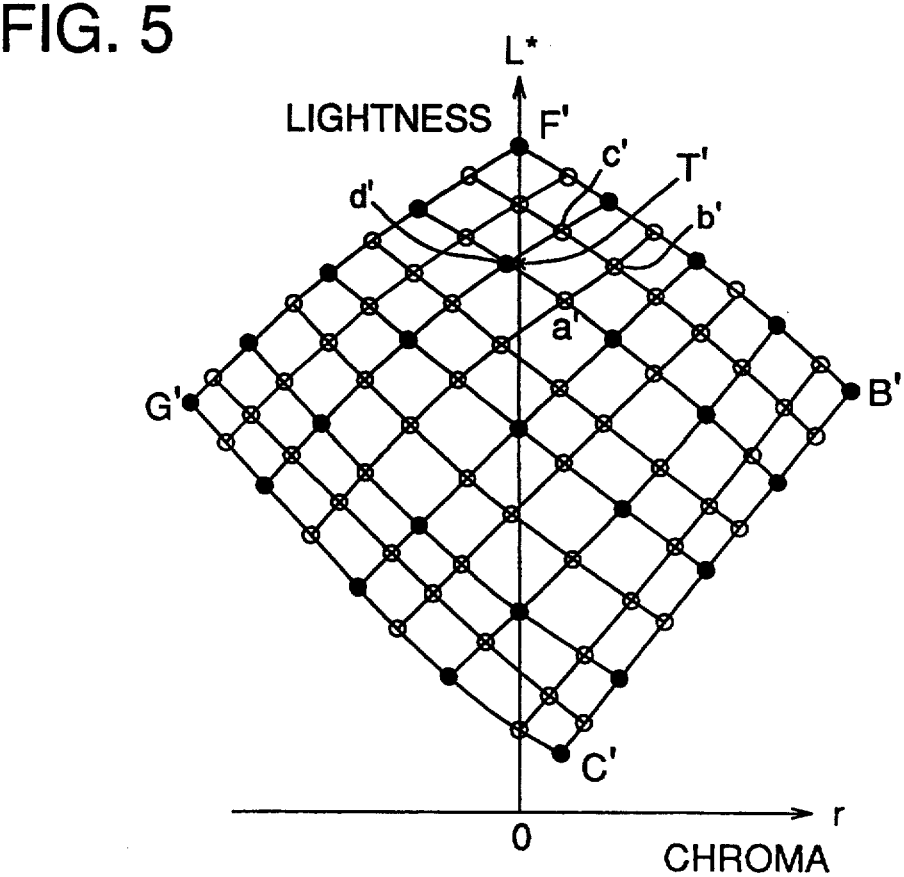
FIG. 5 is the L*u*v* colorimetric system converted from the Y-M coordinate system in FIG. 4.

FIG. 4 shows the Y-M coordinate system. When each lattice point is mapped on the L*u*v* colorimetric system by the process described in (2), FIG. 5 is obtained. The apexes B, C, G, and F of the square shown in FIG. 4 correspond to B', C', G', and F' shown in FIG. 5.

Firstly, a value of the color gamut on the L*u*v* colorimetric system, obtained by target patches of the combinations of Y and M is given as a target value T' (see FIG. 5).

When the target value T' is in the area enclosed by the lattice points a', b', c', and d' as shown in FIG. 5, it is inferred that the combination (target value T) of Y and M on the Y-M coordinate system is in the area enclosed by the lattice points a, b, c, and d as shown in FIG. 4.

The location of the target value T in the area formed by the lattice points a, b, c, and d is obtained by the convergence operation by mapping the colorimetric system shown in FIG. 5 onto the coordinate system shown in FIG. 4. The reason for performing the convergence operation is that the conversion from the coordinate system shown in FIG. 4 to the colorimetric system shown in FIG. 5 is well known, though the reverse conversion is complicated and a satisfactory conversion expression is not known.

Figure 7:
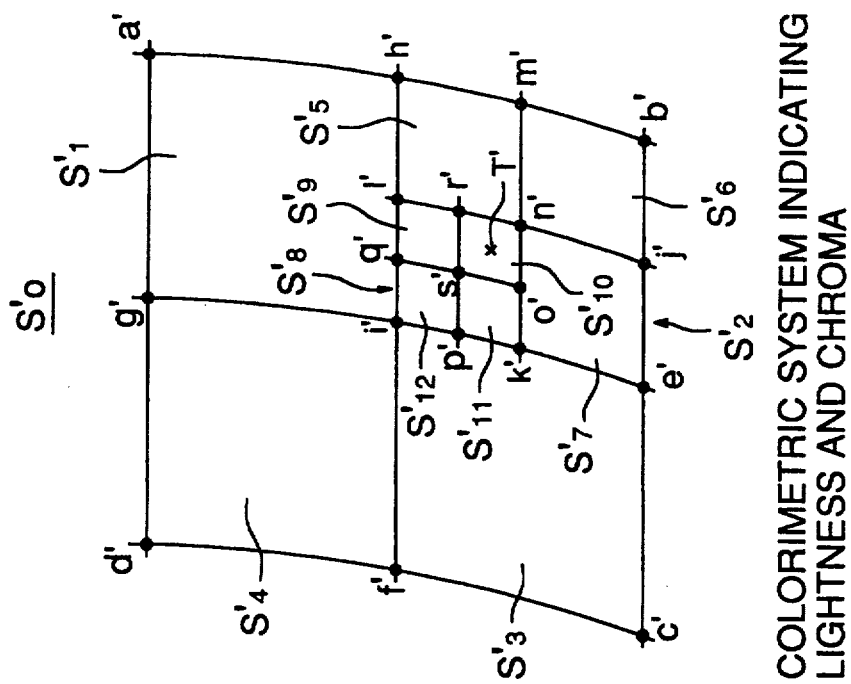
FIG. 7 is the L*u*v* colorimetric system converted from the Y-M coordinate system in FIG. 6, FIGS. 8 to 13 are illustrations for the color estimation method of the present invention.
Figure 6:
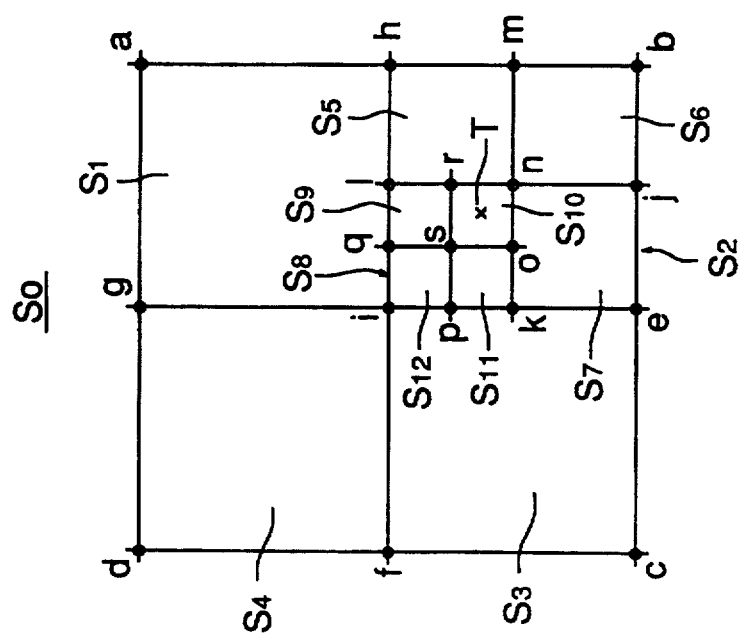
FIG. 6 shows the Y-M coordinate system.

Firstly, the area where the target value T' is located is obtained among a plurality of areas formed by 81 lattice points (see FIG. 5). When the target value T' is in the area S0' as shown in FIG. 7, it is inferred that the target value T is in the area S0 which corresponds to the area S0' as shown in FIG. 6.

Next, the inferred area S0 is equally divided into 4 areas S1, S2, S3, and S4. Five division points, e to i, are calculated by weight average using the peripheral lattice points which are already obtained. The values corresponding to the division points, e to i, are converted to those on the L*u*v* colorimetric system, the converted values are plotted on the colorimetric system shown in FIG. 7, and the area among the four areas S1', S2', S3', and S4' formed by the plotted division points, e' to i', where the target value T' exists, is obtained. When the target value T' is in the area S2' as shown in FIG. 7, it is inferred that the target value T is in the area S2 corresponding to the area S2' as shown in FIG. 6.

Next, the inferred area S2 is equally divided into 4 areas S5, S6, S7, and S8. Five division points, j to n, are calculated by weight average using the peripheral lattice points, which are already obtained, and the division points. The values corresponding to the division points, j to n, are converted to those on the L*u*v* colorimetric system, the converted values are plotted on the colorimetric system shown in FIG. 7, and the area among the four areas S5', S6', S7', and S8' formed by the plotted division points, j' to n', where the target value T' exists, is obtained. When the target value T' is in the area S8' as shown in FIG. 7, it is inferred that the target value T is in the area S8 corresponding to the area S8' as shown in FIG. 6.

Next, the inferred area S8 is equally divided into 4 areas S9, S10, S11, and S12. Five division points, o to s, are calculated by weight average using the peripheral lattice points, which are already obtained, and the division points. The values corresponding to the division points, o to s, are KAW converted to those on the L*u*v* colorimetric system, converted values are plotted on the colorimetric system shown in FIG. 7, and the area among the four areas S9', S10', S11', and S12' formed by the plotted division points o' to s' where the target value T' exists, is obtained. When the target value T' is in the area S10' as shown in FIG. 7, it is inferred that the target value T is in the area S10 corresponding to the area S10' as shown in FIG. 6.

As the areas are divided repeatedly like this, the lattice becomes small gradually and is converged finally. By averaging the four lattice points forming the converged area or the division points, the target value T can be obtained.

For the values of Y, M, and C at each step, which are obtained by the above convergence operation, the value of K is obtained from the expression (1).

Images are printed from the image data of Y, M, C, and K at each step, which are obtained as described above, wedge target printing process, and a gray wedge target is produced.

(7) Next, a wedge target chart wherein the values of L* are at even intervals is displayed on the color CRT device.

A gray wedge target wherein u* and v* are 0 and L* ranges from 20 to 100 at intervals of five quantization levels is displayed (see FIG. 3).

In this case, using L* TV2(R, G, B), u* TV2(R, G, B), and v* TV2(R, G, B) as color gamut data, the values of R, G, and B at each step of the gray wedge target are obtained by the convergence operation.

A gray wedge target is displayed on the color CRT device from the image data of R, G, and B at each step, which are obtained as described above.

(8) Next, the wedge target chart on the color CRT device is compared with the gray wedge target of the printed matter, and whether the condition of discrimination on the boundary at each step of the target on the color CRT device is the same as that of the target of the printed matter is checked. When they are not the same, the values of the L*u*v* colorimetric system of the color gamut on the color CRT device are converted as follows:

$$L^*TV3 = \left(\frac{L^*TV2 - L^*TV2min}{L^*TV2max - L^*TV2min}\right)\gamma \times$$

$$(L^*TV2max - L^*TV2min) + L^*TV2min$$

$$u^*TV3 = \frac{L^*TV3}{L^*TV2} u^*TV2$$

$$v^*TV3 = \frac{L^*TV3}{L^*TV2} v^*TV2$$

The value of the constant r is changed, L* TV3, u* TV3, and v* TV3 are recalculated, the operation in (7) is performed by using L* TV3, u* TV3, and v* TV3 instead of L* TV2, u* TV2, and v* TV2, and the target on the CRT device is compared with the target of the printed matter once again.

The operations in (7) and (8) are repeated, and L* TV3, u* TV3, and v* TV3 can realized good reproduction matched to printing matter, are used in the following operation.

(9) Next, a combination of Y, M, C, and K (color correction data) for each combination of R, G, and B is obtained.

The values L* TV3, u* TV3, and v* TV3 of the L*u*v* colorimetric system for the color (32×32×32=32768) of each combination of R, G, and B are obtained. The values are given to the color gamut of the printed matter (shown in FIG. 2) as a target value T', and the values of Y, M, and C for each combination of R, G, and B are obtained by the convergence operation.

Since the color reproduction gamut of the printed matter is narrower than the color reproduction gamut of the color CRT on this stage, the target value T' may be outside the color reproduction gamut of the printed matter. The target value T' is converted to a value within the color reproduction gamut of the printed matter by one of the following methods in Example 1 to Example 5, and then the values of Y, M, and C are obtained by the convergence operation.

EXAMPLE 1

The values L* TV3, u* TV3, and v* TV3, which are obtained for each combination of R, G, and B, are given to the printed matter color gamut (shown in FIG. 2) as a target value T''. The values of L*, u*, and v* at this time are assumed as L* T'', u* T'', and v* T''. Assuming that the chroma value obtained by $\sqrt{u^* T''^2 + v^* T''^2}$ is rT'' and the hue angle obtained by arctan (v* T''/u* T'') is θT'', the chroma value r INmidT'' which is "a" (a<1.0) times, for example, about ⅔ times, of the maximum chroma value r INmaxT'' of the color gamut of the printed matter for L* T'' and θT'' is taken as a threshold value (see FIG. 8).

When rT'' is smaller than r INmidT'', no correction is performed, and it is assumed that L* T'=L* T'', u* T'=u* T'', v* T'=v* T'', rT'=rT'', and θT'=θT''.

When rT' is larger than r INmidT', it is assumed nhat L* T'=L* T'' and θT'=θT'' and rT' is expressed as follows:

$$rT = \frac{(rINmaxT' - rINmidT')}{(rTVmaxT' - rINmidT')} \times (rT' - rINmidT') + rINmidT'$$

In this expression, r TVmaxT'' is the maximum chroma value of the color gamut on the color CRT device for L* T'' and θT'' (see FIG. 8). u* T' and v* T' are so determined that θT'=θT'' and that rT' satisfies the above expression.

As described above, L* T', u* T', and v* T' which are converted from L* T'', u* T'', and v* T''are within the color reproduction scope of the printed matter.

The maximum chroma value is obtained as specified below.

Values wherein only values of combinations for the outer surface of the color gamut are converted to lightness L*, chroma r, and hue θ are used. There are 8 surfaces which constitute the outer surface of the color gamut, where the values of Y, M, and C or R, G, and B are all 0 or maximum. The location of the maximum chroma value in the lattice containing the hue θ and lightness L* is searched for, and the maximum chroma value is obtained from the chroma values at 4 peripheral points by weight average.

EXAMPLE 2

Figure 9:
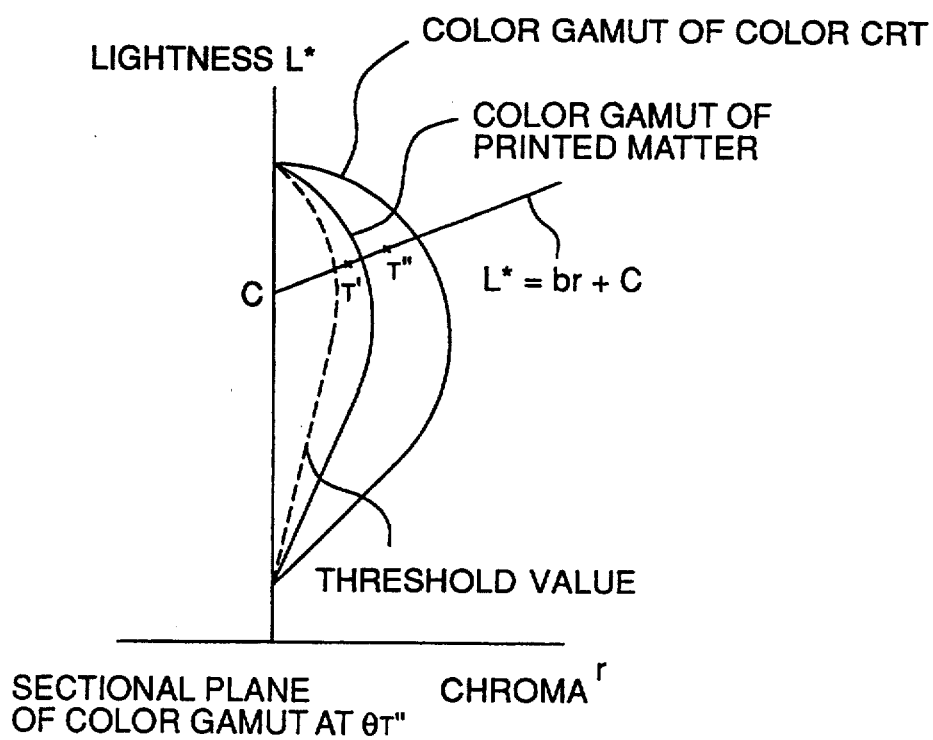

In this example, a straight line passing L*T'' and rT'' on a section of the color gamut at a hue angle of θT'' is considered (see FIG. 9). The straight line is expressed as shown below. In this expression, a symbol r indicates a chroma.

$$L^* = b \times r + c \tag{2}$$

By the movement distance which is obtained from the maximum chroma value of the color gamut of the printed matter on the straight line, the chroma value which is ⅔ times of the maximum chroma value, and the maximum chroma value of the color gamut on the color CRT device, the target value moves inward on the straight line.

The meaning of the above straight line is that since the target value moves on the straight line, the rate at which the lightness is decreased or increased so as to decrease the chroma is determined.

Expression 2 is determined as follows depending on the value of L* T'':

When L* T'' ≤ 70;
b = 0
c = L* T''
Hence:

$$L^* = b \times r + c \tag{2a}$$
$$= L^*T'$$

When L* T'' > 70:
b = (L* 0 − 70)/30 × 0.15
c = L* 0
Hence:

$$L^* = b \times r + c \tag{2b}$$
$$= (L^*0 - 70)/(30 \times 0.15) \times r + L^*0$$

L* 0 indicates a value of L* when r=0 and is obtained, for example, as shown below by using L* T'' and rT'' for L* and r in Expression 2:

$$L^*0 = \frac{L^*T'' + 0.15 \times 70 \times rT''/30}{1 + 0.15 \times rT''/30}$$

Figure 10:
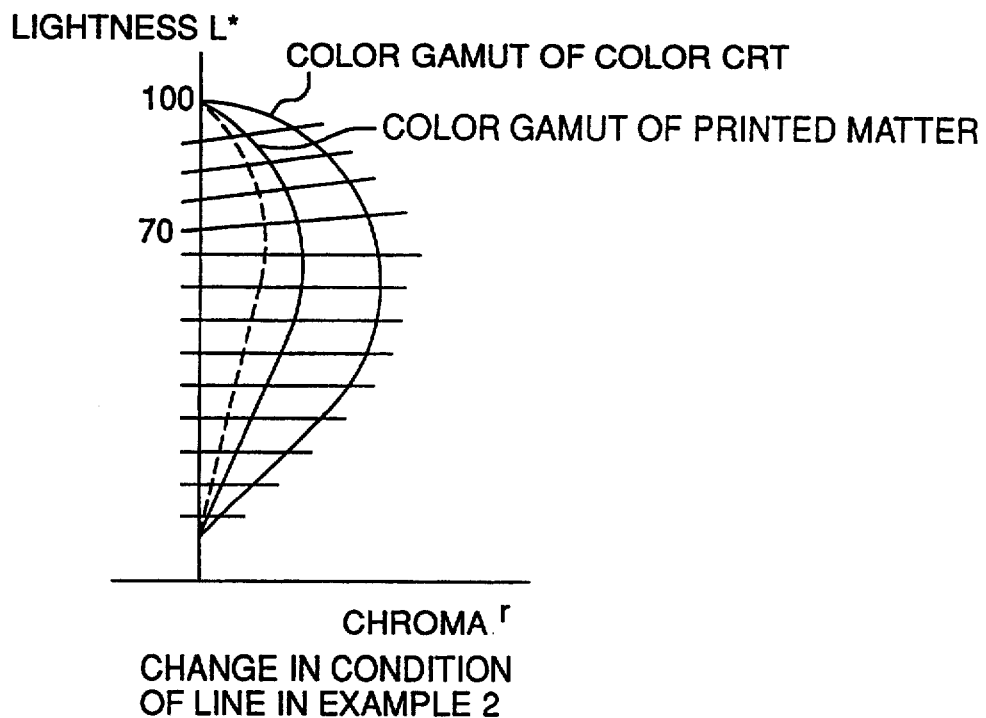

FIG. 10 shows status changes of the straight line which is determined as described above.

Next, the chroma is converted on the straight line which is determined by the target value T'' like this.

Figure 11:
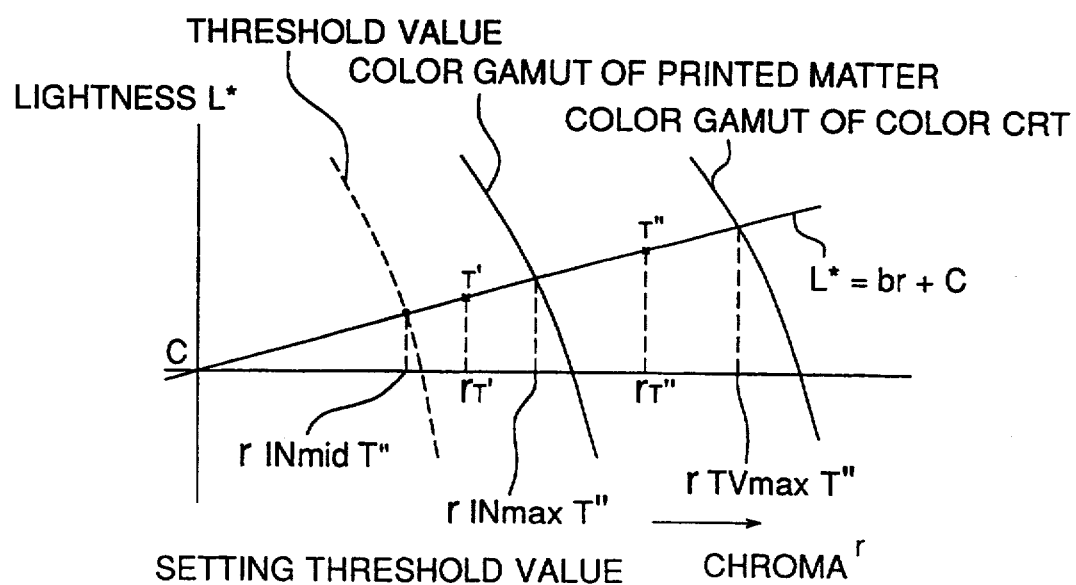

As shown in FIG. 11, the chroma value r INmidT'' which is "a" times (a<1.0), for example, about ⅔ times of the maximum chroma value r INmaxT'' of the color gamut of the printed matter on the straight line is assumed as a threshold value.

When rT'' is smaller than r INmidT'', no correction is performed, and it is assumed that L* T'=L* T'', u* T'=u* T'', v* T'=V* T'', rT'=rT'', and θT'=θT''.

When rT'' is larger than r INmidT'', it is assumed that the maximum chroma value of the color gamut of color CRT on the straight line is r TVmaxT'' and rT' is obtained as follows:

$$rT = \frac{(rINmaxT' - rINmidT')}{(rTVmaxT' - rINmidT')} \times (rT' - rINmidT') + rINmidT'$$

It is assumed that the hue angle is fixed and θT'=θT''. u* T' and v* T' are values when θT'=θT'' and rT' satisfies the above expression.

Furthermore, since the variation of lightness when the chroma value moves from rT'' to rT' on the straight line is b (rT''−rT'), it is assumed that:

L* T'=L* T''−b (rT''−rT')

In this case, when L* T'' < 70, b = 0 and the lightness does not change. When L* T'' > 70, b > 0 and the lightness decreases.

As described above, L* T', u* T' and v* T' which are converted from L* T'', u* T'', and v* T'' are within the color reproduction scope of the printed matter.

Figure 12:
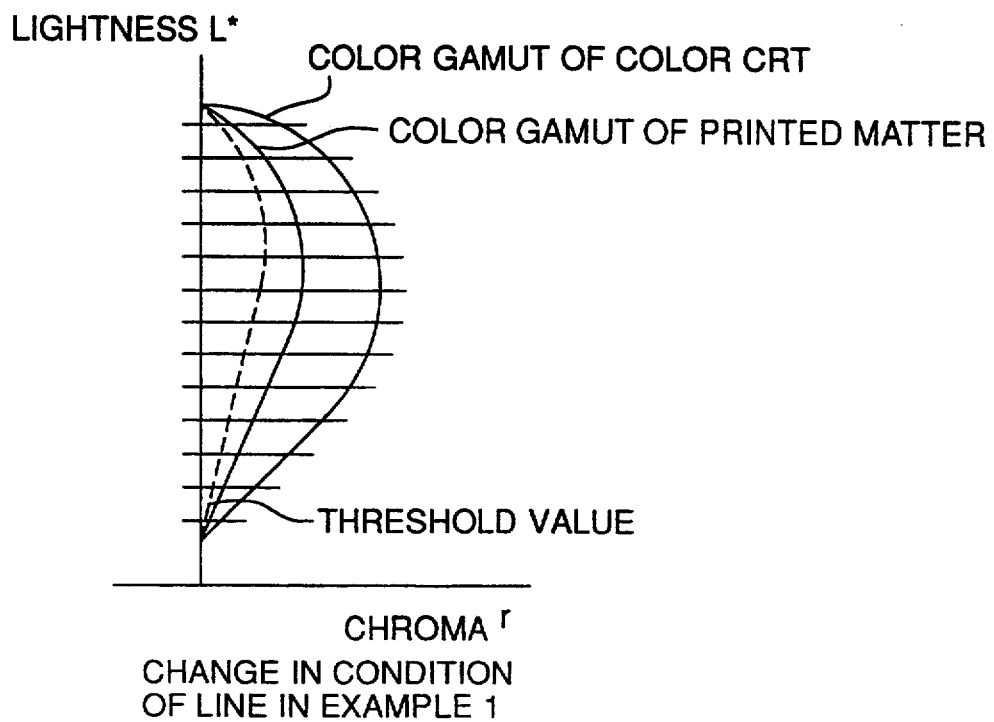

Example 1 is equivalent to Example 2 wherein L* of the expression of the straight line, Expression 2, is fixed to L* T''. FIG. 12 shows status changes of the straight line in Example 1.

Example 3

Also in this example, the straight line expressed by Expression (2) is assumed in the same way as with Example 2. In this example, Expression (2) is determined as shown below depending on the value of L* T'':

When L* T'' < 50:
b = (50 − L* 0)/30 × (−0.15)
c = L* 0
Hence:

$$L^* = b \times r + c \qquad (2c)$$
$$= (50 - L^*0)/(30 \times (-0.15)) \times r + L^*0$$

When 50 ≦ L* T'' ≦ 70:
b = 0
c = L* T''
Hence:

$$L^* = L^* T'' \qquad (2d)$$

When L* T'' > 70:
b = (L* 0 − 70)/30 × 0.15
c = L* 0
Hence:

$$L^* = b \times r + c \qquad (2e)$$
$$= (L^*0 - 70)/(30 \times 0.15) \times r + L^*0$$

Figure 13:
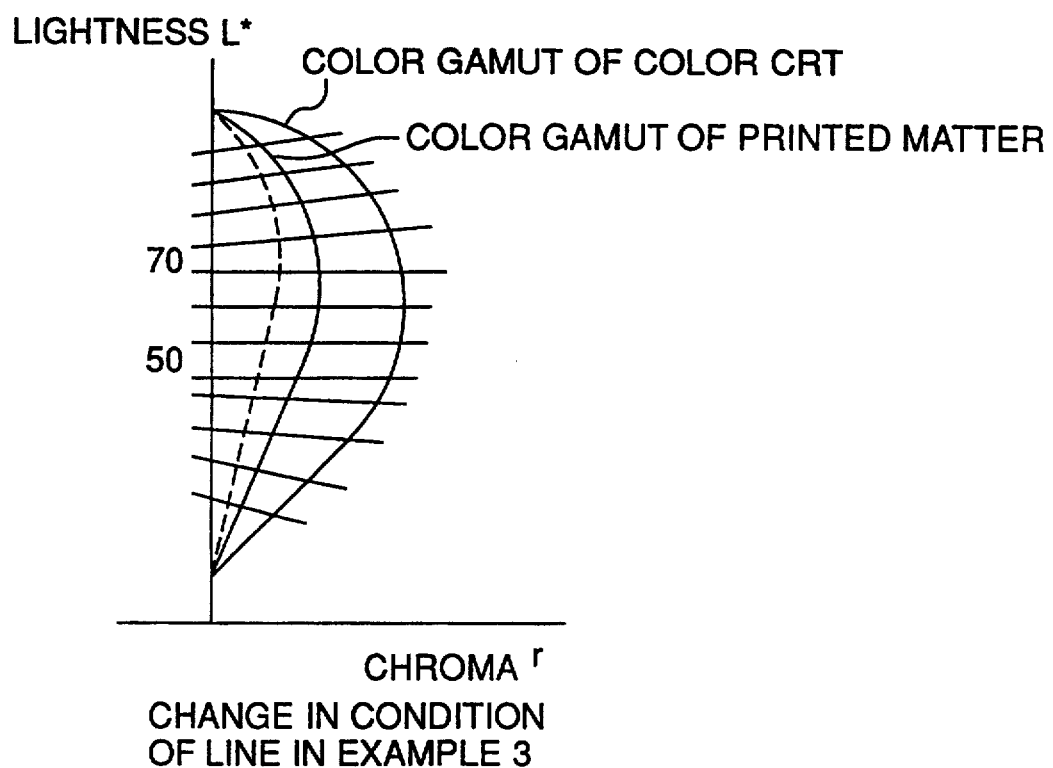

FIG. 13 shows status changes of the straight line which is determined as described above.

Next, the chroma r is converted on the straight line which is determined by the target value T'' like this.

As shown in FIG. 11, the chroma value r INmidT'' which is "a" times (a < 1.0), for example, about ⅔ times of the maximum chroma value r INmaxT'' of the color gamut of the printed matter on the straight line is assumed as a threshold value.

When rT'' is smaller than r INmidT'', no correction is performed, and it is assumed that L* T' = L* T'', u* T' = u* T'', v* T' = v* T'', rT' = rT'', and θT' = θT''.

When rT'' is larger than r INmidT'', it is assumed that the maximum chroma value of the color gamut of color CRT on the straight line is r TVmaxT'' and rT' is obtained as follows:

$$rT' = \frac{(rINmaxT'' - rINmidT'')}{(rTVmaxT'' - rINmidT'')} \times$$

$$(rT'' - rINmidT'') + rINmidT''$$

It is assumed that the hue angle is fixed and θT' = θT''. u* T' and v* T' are values when θT' = θT'' and rT' satisfies the above expression.

Furthermore, since the variation of lightness when the chroma value moves from rT'' to rT' on the straight line is b (rT'' − rT'), it is assumed that:

L* T' = L* T'' − b(rT'' − rT')

In this case, when L* T'' < 50, b < 0 and the lightness increases. When 50 ≦ L* T'' ≦ 70, b = 0 and the lightness does not change. When L* T'' > 70, b > 0 and the lightness decreases.

As described above, L* T', u* T', and v* T' which are converted from L* T'', u* T'' and v* T'' are within the color reproduction scope of the printed matter.

EXAMPLE 4

Figure 8:
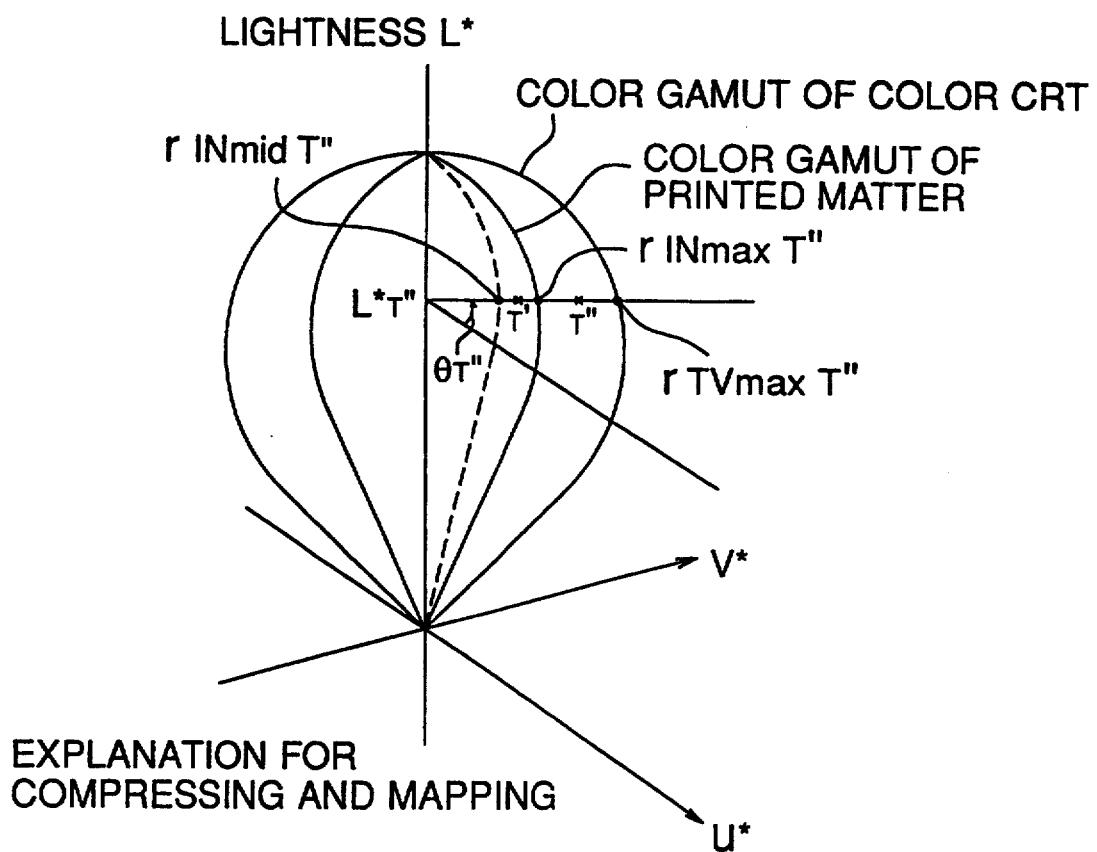

In this example as shown in FIG. 8, in the same way as with Example 1, the chrome value r INmidT'' which is about ⅔ times of the maximum chrome value r INmaxT'' of the color gamut of the printed matter is assumed as a threshold value.

When rT'' is smaller than r INmidT'', no correction is performed, and it is assumed that L* T' = L* T'', u* T' = u* T'', v* T' = v* T'', rT' = rT'', and θT' = θT''.

When rT'' is larger than r INmidT'', rT' is set as shown below depending on θT''.

Figure 14:
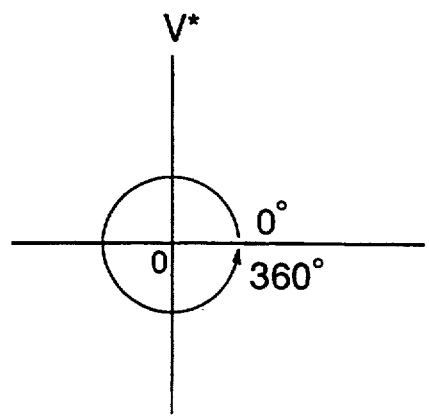
FIG. 14 shows hue angle on the L*u*v* colorimetric system.

If the expression "120° ≦ θT'' ≦ 170°" is not held when the hue angle θ is set as follows (see FIG. 14):

θ = 0°: Positive on the u* axis
θ = 90°: Positive on the v* axis
θ = 180°: Negative on the u* axis
θ = 270°: Negative on the v* axis
θ = 360°: Positive on the u* axis it is required that L* T' = L* T'' and θT' = θT'' and rT' is expressed as follows:

$$rT' = \frac{(rINmaxT'' - rINmidT'')}{(rTVmaxT'' - rINmidT'')} \times$$

$$(rT'' - rINmidT'') + rINmidT''$$

In this expression, r TVmaxT'' is the maximum chroma value of the color gamut on the color CRT device for L* TV3 and θT'' (see FIG. 8). u* T' and v* T' are values when θT' = θT'' and rT' satisfies the above expression.

Next, when the expression "120° ≦ θT'' ≦ 170°" is held, θT'' is converted to θT'' 2 by the following expression.

131° is a hue angle at the maximum chroma point of G (green) of the color gamut of color CRT (see FIG. 1), and 147° is a hue angle at the maximum chroma point of G (green) of the color gamut of the printed matter (see FIG. 2). When 120° ≦ θT'' ≦ 131°:

$$\theta T'2 = (147° - 131°) \frac{(rINmaxT'' - rINmidT'')}{(rTVmaxT'' - rINmidT'')} \times$$

$$(rT'' - rINmidT'') \times \frac{(\theta T'' - 120°)}{(131° - 120°)} + \theta T''$$

When 131° < θT'' ≦ 170°:

$$\theta T'2 = (147° - 131°) \frac{(rINmaxT'' - rINmidT'')}{(rTVmaxT'' - rINmidT'')} \times$$

$$(rT'' - rINmidT'') \times \frac{(170° - \theta T'')}{(170° - 131°)} + \theta T''$$

Therefore, it is required that L* T' = L* T'' and θT'' and θT' = θT'' 2 and rT' is expressed as follows:

$$rT' = \frac{(rINmaxT''2 - rINmidT''2)}{(rTVmaxT''2 - rINmidT''2)} \times$$

$$(rT'' - rINmidT''2) + rINmidT''2$$

In this expression, r INmaxT″ 2 indicates the maximum chroma value of the color gamut of the printed matter for L* T″ and θT″ 2, r INmidT″ 2 indicates a chroma value which is "a" times of r INmaxT″ 2, and r TVmaxT″ 2 indicates the maximum chroma value of the color gamut of color CRT for L* T″ and θT″ 2.

u* and v* are values when θT′=θT″ 2 and rT′ satisfies the above expression.

As described above, L* T′, u* T′, and v* T′ which are converted from L* T″, u* T″, and v* T″ are within the color reproduction gamut of the printed matter.

The maximum chroma value can be obtained in the same as with Example 1.

EXAMPLE 5

In this example, in the same way as with Example 1 or Example 4, the chroma value r INmidT″ which is about ⅔ times of the maximum chroma value r INmaxT″ of the color gamut of the printed matter is assumed as a threshold value.

When rT″ is smaller than r INmidT″, no correction is performed, and it is assumed that L* T′=L* T″, u* T′=u* T″, v* T′=v* T″, rT′=rT″, and θT′=θT″.

When rT″ is larger than r INmidT′, rT′ is set as shown below depending on θT″.

When the expression "200°≦θT″≦300°″" is not held, it is required that L* T′=L* T″ and OT′=OT″ and rT′ is expressed as follows:

$$rT' = \frac{(rINmaxT'' - rINmidT'')}{(rTVmaxT'' - rINmidT'')} \times (rT'' - rINmidT'') + rINmidT''$$

In this expression, r TVmaxT″ is the maximum chroma value of the color gamut on the color CRT device for L* TV3 and ΘT. (see FIG. 8).

u* T′ and v* T′ are values when θT′=θT″ and rT′ satisfies the above expression.

Next, when the expression "200°≦θT″300°″" is held, θT″ is converted to θT″ 2 by the following expression.

266° is a hue angle at the maximum chroma point of B (blue) of the color gamut of the color CRT (see FIG. 1), and 234° is a hue angle at the maximum chroma point of C (cyan) of the color gamut of the printed matter (see FIG. 2). When 266°≦θT″≦300°:

$$\theta T'2 = (234° - 266°)\frac{(rINmaxT'' - rINmidT'')}{(rTVmaxT'' - rINmidT'')} \times (rT'' - rINmidT'') \times \frac{(300° - \theta T'')}{(300° - 266°)} + \theta T''$$

When 200°≦θT″≦266°:

$$\theta T'2 = (234° - 266°)\frac{(rINmaxT'' - rINmidT'')}{(rTVmaxT'' - rINmidT'')} \times (rT'' - rINmidT'') \times \frac{(\theta T'' - 200°)}{(266° - 200°)} + \theta T''$$

Therefore, it is required that L* T′=L* T″ and θT′=θT″ 2 and rT′ is expressed as follows:

$$rT' = \frac{(rINmaxT'2 - rINmidT'2)}{(rTVmaxT'2 - rINmidT'2)} \times (rT' - rINmidT'2) + rINmidT'2$$

In this expression, r INmaxT″ 2 indicates the maximum chroma value of the color gamut of the printed matter for L* T″ and θT″ 2, r INmidT″ 2 indicates a chroma value which is "a" times of r INmaxT″ 2, and r TVmaxT″ 2 indicates the maximum chroma value of the color gamut of the color CRT for L* T″ and θT″ 2.

u* and v* are values when θT′=θT″ 2 and rT′ satisfies the above expression.

As described above, L* T′, u* T″, and v* T′ which are converted from L* T″, u* T″, and v* T″ are within the color reproduction gamut of the printed matter.

Next, the values L* T′, u* T′, and v* T′ which are obtained for each combination of R, G, and B, are given to the printed matter color gamut (shown in FIG. 2) as a target value T′, and the values of Y, M, and C are obtained by the convergence operation. Since the convergence operation is the same as the one described in FIGS. 4 to 7, the description is omitted.

For each combination of Y, M, and C for each combination of R, G, and B which are obtained in Example 1 to Example 5 like this, the value of K is obtained from Expression (1).

By doing this, combinations of Y, M, C, and K for reproducing reproduced colors by each combination of R, G, and B, for example, by color printing are obtained.

In this example, as described above, as to the lightness direction, L* among the values of the colorimetric system obtained for each combination of R, G, and B is converted according to the ratio of the lightness range of the color gamut of the color CRT (input side) on the lightness axis to that of the color gamut of the printed matter (output side), and the lightness of the color gamut of the color CRT is compressed and mapped. As to the chroma direction, no value is corrected at the overlapped center portion of the color gamut of the color CRT (input) and that of the color gamut of the printed matter (output). In the peripheral area, u* and v* among the values of the colorimetric system obtained for each combination of R, G, and B are converted according to the chroma range of the two color gamuts and the chroma of the color gamut of color CRT is compressed and mapped.

By doing this, the color reproduction gamut of color CRT is included in the color reproduction gamut of the printed matter by a natural conversion result, and the color reproduction obtained by a combination of Y, M, C, and K provides satisfactory and natural lightness and chroma.

In this example, for example, in a high or low lightness area, the slope of the straight line is positive or negative and the decrease amount of chroma is suppressed when the chroma is compressed and mapped, and hence decreases in color saturation caused by compression and mapping in the high lightness and chroma area or in the low lightness and chroma area can be prevented.

When the chroma of the color gamut of the color CRT is compressed and mapped, the hue is moved in the direction from the G (green) peak of the color gamut of the color CRT to the G peak of the color gamut of the printed matter or from the B (blue) peak of the color gamut of the color CRT to the C (cyan) peak of the color gamut of the printed matter, and hence the chroma is balanced as a whole.

In Example 5 of the above embodiment, the hue is moved in the direction from the B (blue) peak of the color gamut of the color CRT to the C (cyan) peak of the color gamut of the printed matter. The hue may be moved to the M (magenta) peak in the reverse direction.

In Example 4 or Example 5 of the above embodiment, the hue range where the hue is moved is limited to one area. A plurality of areas may be used, and Example 4 and Example 5 may be used simultaneously.

In the above embodiment, the lightness is kept constant when the chroma is moved. The lightness may be changed as the chroma moves.

In the above embodiment, the CIE standard L*u*v* colorimetric system is used as a colorimetric system. The CIE standard L*a*b* colorimetric system may be used.

Next, a color masking device, which is constructed so that the color correction data (Y, M, C, and K) obtained as described above is stored in a look up table (LUT) beforehand and the color correction data is referred to by input image data (R, G, B), will be described.

In this case, when Y, M, C, and K image data corresponding to all R, G, and B image data is to be stored in the lookup table, a large capacity is required for the lookup table.

The applicant proposes a method that to reduce the memory capacity, a color space formed by R, G, and B image data is divided into a plurality of basic lattices, Y, M, C, and K image data for a combination of R, G, and B image data positioned at the apexes thereof are stored in the lookup table, and when Y, M, C, and K image data for a combination of R, G, and B image data do not exist, Y, M, C, and K image data are obtained by weight average of the Y, M, C, and K image data at the apexes of the basic lattices containing the R, G, and B image data (interpolation point).

Figure 15:
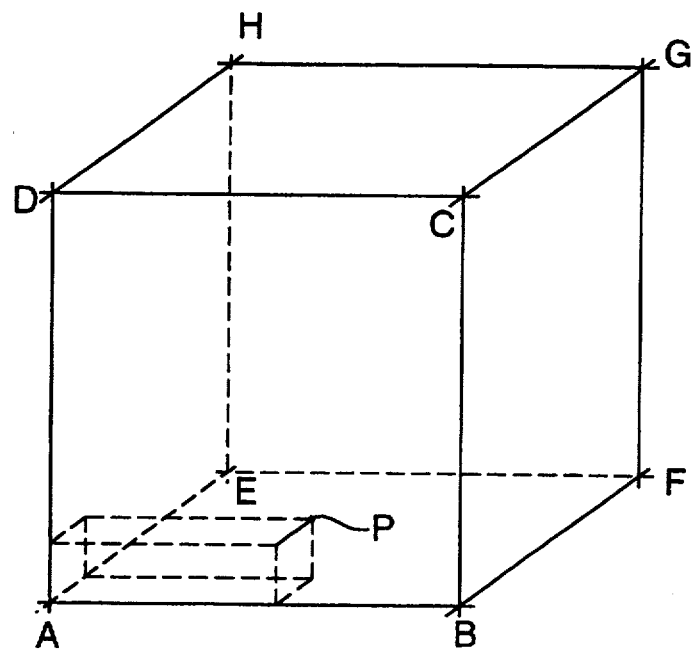
FIGS. 15 to 18 are illustrations for the interpolation processing.

As shown in FIG. 15, for example, when an interpolation point P exists in a basic lattice formed by the apexes A to H, the volume of each cuboid formed by the apexes which are diagonally positioned to the interpolation point P and point P itself is used as a weighting factor for the Y, M, C, and K image data at the apexes A to H. Assuming that the Y, M, C, and K image data at the apexes A to H of the basic lattice containing the interpolation point P are Yi, Mi, Ci, and K (i=1 to 8) and the weighting factor for the Y, M, C, and K image data at the apexes A to H is Ai (i=1 to 8), Y, M, C, and K image data Yp, Mp, Cp, and Kp at the interpolation point P are calculated from the following expression.

$$Yp = \left(1/\sum_{i=1}^{8} Ai\right) \sum_{i=1}^{8} AiYi$$

$$Mp = \left(1/\sum_{i=1}^{8} Ai\right) \sum_{i=1}^{8} AiMi$$

$$Cp = \left(1/\sum_{i=1}^{8} Ai\right) \sum_{i=1}^{8} AiCi$$

$$Kp \left(1/\sum_{i=1}^{8} Ai\right) \sum_{i=1}^{8} AiKi$$

(3)

In this interpolation process, calculation of Y, M, C, and K image data Yp, Mp, Cp, and Kp at the interpolation point P requires 8 times of multiplication accumulation processing for each data.

The applicant proposes interpolation process which minimizes the multiplication accumulation process count.

Figure 16:
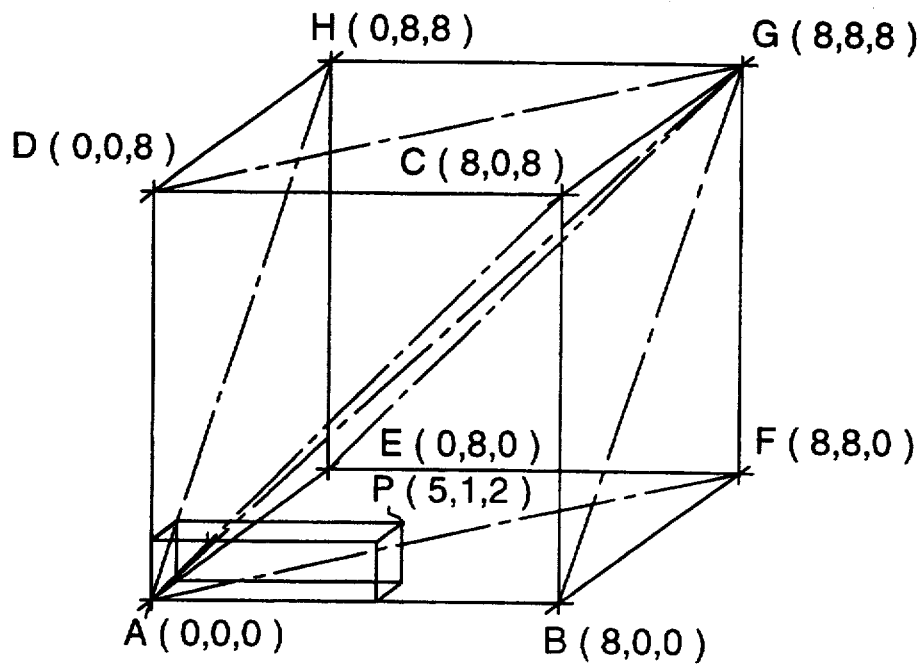
Figure 17:
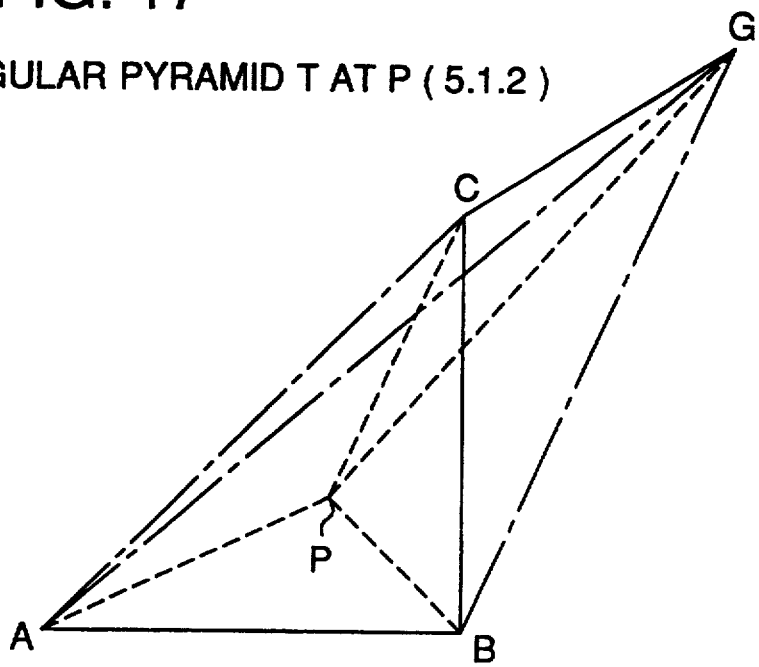

For a basic lattice formed by the apexes A to H, as shown in FIG. 16, six triangular pyramids enclosed by dashed lines are formed. When the coordinates of an interpolation point P are (5, 1, 2), the interpolation point P is contained in a triangular pyramid T formed by the apexes A, B, C and G as shown in FIG. 17.

When the triangular pyramid T is determined, the interpolation point P is connected to the apexes A, B, C, and G, new 4 triangular pyramids are formed, and the volumes $V_{BCGP}$, $V_{ACGP}$, $V_{ABGP}$, and $V_{ABCP}$ can be obtained. The Y, M, C, and K image data Yp, Mp, Cp, and Kp at the interpolation point P are calculated from the volumes and the Y, M, C, and K image data $Y_A$ to $Y_G$, $M_A$ to $M_G$, $C_A$ to $C_G$, and $K_A$ to $K_G$ at the apexes A, B, C, and G using the following expressions:

$V_{ABCG}$ indicates the volume of the triangular pyramid T.

$$Yp = 1/V_{ABCG}$$
$$(V_{BCGP}Y_A + V_{ACGP}Y_B + V_{ABGP}Y_C + V_{ABCP}Y_G)$$

$$Mp = 1/V_{ABCG}$$
$$(V_{BCGP}M_A + V_{ACGP}M_B + V_{ABGP}M_C + V_{ABCP}M_G)$$

$$Cp = 1/V_{ABCG}$$
$$(V_{BCGP}C_A + V_{ACGP}C_B + V_{ABGP}C_C + V_{ABCP}C_G)$$

$$Kp = 1/V_{ABCG}$$
$$(V_{BCGP}K_A + V_{ACGP}K_B + V_{ABGP}K_C + V_{ABCP}K_G)$$

(4)

Figure 18:
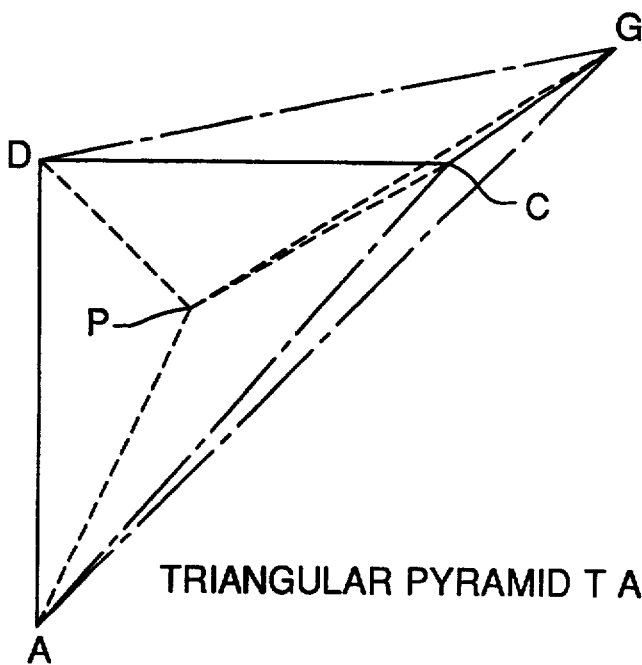

When the coordinates of the interpolation point P are changed, the triangular pyramid T to be used is changed. When the coordinates of the interpolation point P are P(3, 1, 5), for example, the interpolation point P is contained in a triangular pyramid T formed by the apexes A, C, D, and G as shown in FIG. 18 and this triangular pyramid is used.

In the interpolation processing using a triangular pyramid like this, the Y, M, C, and K image data Yp, Mp, Cp, and Kp at the interpolation point P can be calculated by 4 times of multiplication accumulation processing.

Figure 19:
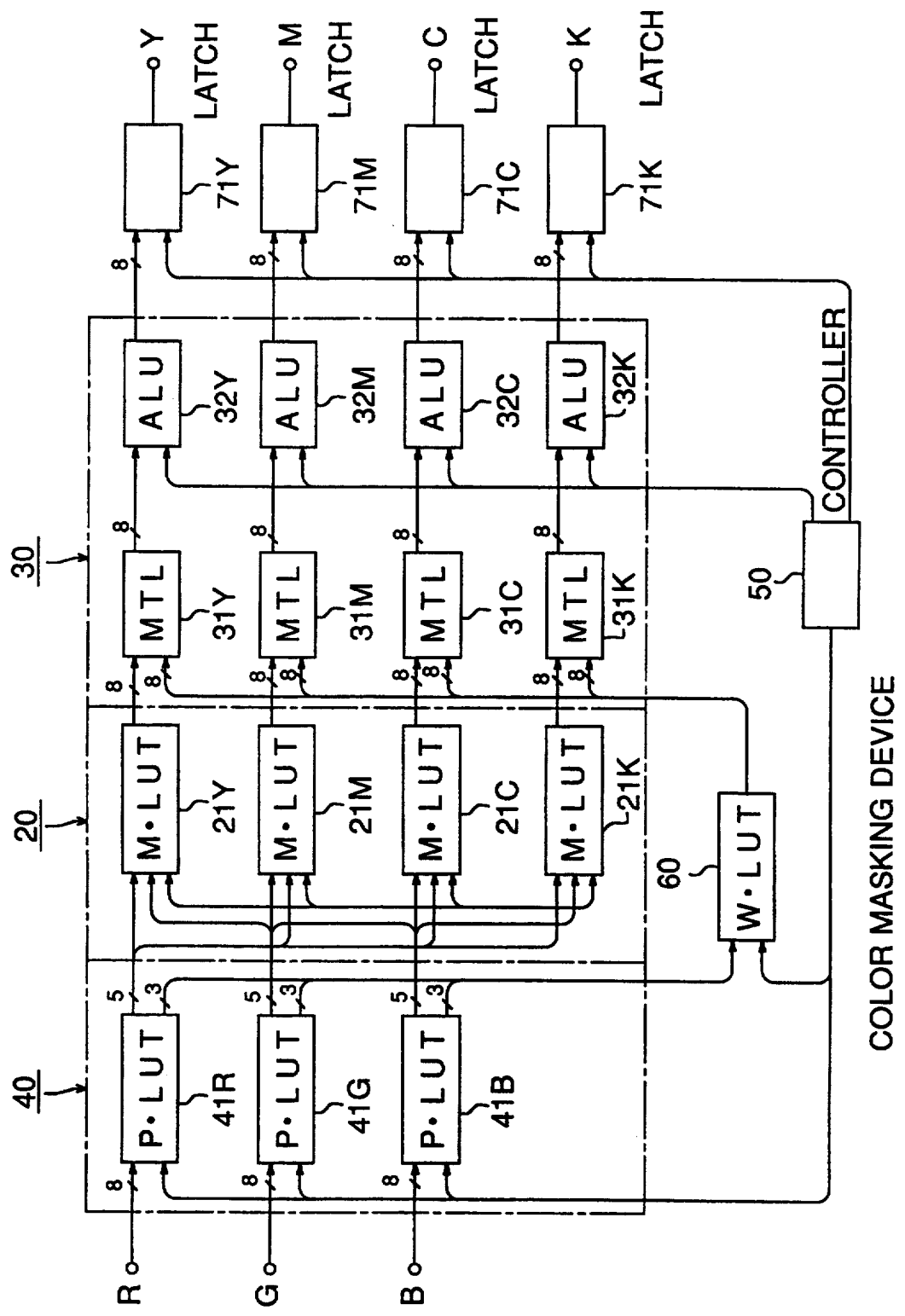
FIGS. 19 and 20 are schematic views of a color masking device.

FIG. 19 shows an actual configuration example of a color masking device.

In FIG. 19, numeral 20 indicates a color correction data storage means, and lookup tables (MLUT) 21Y to 21K constituting the storage means 20 store Y, M, C, and K color correction data.

ROMs, for example, with a capacity of 256K bits are used for MLUT21Y to MLUT21K, only 32 points between the minimum level and the maximum level of R, G, and B image data are extracted, and image data at 32×32×32=32768 points are stored in each of MLUT21Y to MLUT21K.

In this case, R, G, and B image data are 8 bits long and have 256 gradations. As to distribution of 32 points, 256 is evenly divided into 32 portions by 8 sequentially, for example, starting at 0 as follows:

0, 8, 16, ···, 240, 248

The numbers from 249, which is the 33rd point, to 255 are not used or handled as 248.

The Y, M, C, and K image data at the distribution points, that is, at the apexes of the basic lattice whose basic lattice interval is the 8-quantization level are calculated as described above, and the calculated image data are stored in MLUT21Y to MLUT21K.

Numeral 60 indicates a lookup table (WLUT) constituting a weighting factor storage means. WLUT60 stores the weighting factor corresponding to each interpolation point.

In the case of the interpolation process using a cube, when the basic lattice interval is the 8-quantization level as described above, the total of 8 times of weighting factors is:

$$8 \times 8 \times 8 = 512$$

Which is normalized so that the total is 256 revel. The maximum weighting factor is 255 so that a 8-bit general purpose IC can be used as WLUT60. When the interpolation point P is, for example, at a position which is the same as the apex A shown in FIG. 15, the weighting factors P1 to P8 are as follows:

| P1, | P2, | P3, | P4, | P5, | P6, | P7, | P8 |
|---|---|---|---|---|---|---|---|
| 255, | 0, | 0, | 0, | 0, | 0, | 0, | 1 |
| (512, | 0, | 0, | 0, | 0, | 0, | 0, | 0) |

The total of weighting factors is always 256.

In the case of the interpolation process using a triangular pyramid, when the basic lattice interval is the 8-quantization level as described above, the total of 4 times of weighting factors is:

$$8 \times 8 \times 8/6 = 512/6$$

Which is normalized so that the total is 256.

The maximum weighting factor is 255 so that a 8-bit general purpose IC can be used as WLUT60. When the interpolation point P is, for example, at a position which is the same as the apex A shown in FIG. 16, the weighting factors $V_{BCGP}$, $V_{ACGP}$, $V_{ABGP}$, and $V_{ABCP}$ are as follows:

| $V_{BCGP}$, | $V_{ACGP}$, | $V_{ABGP}$, | $V_{ABCP}$ |
|---|---|---|---|
| 255, | 0, | 0, | 1 |
| (512/6, | 0, | 0, | 0) |

The total of weighting factors is always 256.

R, G, and B image data are supplied to lookup tables (PLUT) 41R to 41B constituting an address signal generation means 40, and distribution signals are supplied to PLUT41R to PLUT41B from a controller 50.

5-bit address signals corresponding to the upper 5 bits (indicating the reference points at the apexes of the basic lattice containing the interpolation point P) of R, G, and B image data are outputted from PLUT41R to PLUT41B and supplied to MLUT21Y to MLUT21K.

In the case of the interpolation process using a cube, 5-bit address signals are outputted sequentially according to distribution signals so that the 8 apexes of the basic lattice containing the interpolation point P are specified sequentially by MLUT21Y to MLUT21K.

In the case of the interpolation process using a triangular pyramid, 5-bit address signals are outputted sequentially according to distribution signals so that the 4 apexes of the triangular pyramid containing the interpolation point P are specified sequentially by MLUT21Y to MLUT21K.

Y, M, C, and K image data outputted from MLUT21Y to MLUT21K are supplied to multipliers (MTL) 31Y to 31K constituting a multiplication accumulation means 30.

Lower 3 bits (indicating the position of the interpolation point P in the basic lattice) of R, G, and B image data are outputted from PLUT41R to PLUT41B as weighting factor specification signals, and the weighting factor specification signals are supplied to WLUT60. Distribution signals are supplied to WLUT60 from the controller 50, and the weighting factors are sequentially outputted according to the distribution signals.

In the case of the interpolation process using a cube, as the 8 apexes of the basic lattice containing the interpolation point P are specified sequentially by MLUT21Y to MLUT21K, the 8 weighting factors P1 to P8 are sequentially outputted.

In the case of the interpolation process using a triangular pyramid, as the 4 apexes of the triangular pyramid containing the interpolation point P are specified sequentially by MLUT21Y to MLUT21K, the 4 weighting factors are sequentially outputted.

Weighting factors outputted from WLUT60 are supplied to MTL31Y to MTL31K. Y, M, C, and K image data (8 bits long) outputted from MLUT21Y to MLUT21K are multiplied by weighting factors (8 bits long) from WLUT60 in MTLS1Y to MTL31K.

Multiplication outputs of upper 8 bits of MTL31Y to MTL31K are supplied to accumulators (ALU) 32Y to 32K and added by them. A reset signal is supplied to ALU32Y to ALU32K from the controller 50.

In the case of the interpolation process using a cube, in correspondence with the 8 apexes of the basic lattice containing the interpolation point P, the add operation is performed sequentially. Whenever the results are latched by a latch circuit which will be described later, the accumulators are reset.

In the case of the interpolation process using a triangular pyramid, in correspondence with the 4 apexes of the triangular pyramid containing the interpolation point P, the add operation is performed sequentially. Whenever the results are latched by a latch circuit which will be described later, the accumulators are reset.

As described above, the total of 8 weighting factors in the case of the interpolation processing using a cube and the total of 4 weighting factors in the case of the interpolation process using a triangular pyramid are 256. In this example, the upper 8 bits of multiplication outputs of MTL31y to MTL31Y are used, that is, a so-called 8-bit shift is performed. By doing this, the processing of $$1/\sum_{i=1}^{8} Ai$$

in Expression (3) and 1/V ABCG in Expression (4) is performed.

Outputs of ALU32Y to ALU32K constituting the multiplication accumulation means 30 are supplied to latch circuits 71Y to 71K. A latch pulse is supplied to the latch circuits 71Y to 71k from the controller 50.

In the case of the interpolation process using a cube, the results of the add operation which is performed sequentially in correspondence with the 8 apexes of the basic lattice containing the interpolation point P are latched.

In the case of the interpolation process using a triangular pyramid, the results of the add operation which is performed sequentially in correspondence with the 4 apexes of the triangular pyramid containing the interpolation point P are latched.

Therefore, in the case of the interpolation processing using a cube, Y, M, C, and K image data expressed by Expression (3), at the interpolation point P are outputted from the latch circuits 71Y to 71K. In the case of the interpolation process using a triangular pyramid, Y, M, C, and K image data expressed by Expression (4), at the interpolation point P are outputted from the latch circuits 71Y to 71K.

Figure 20:
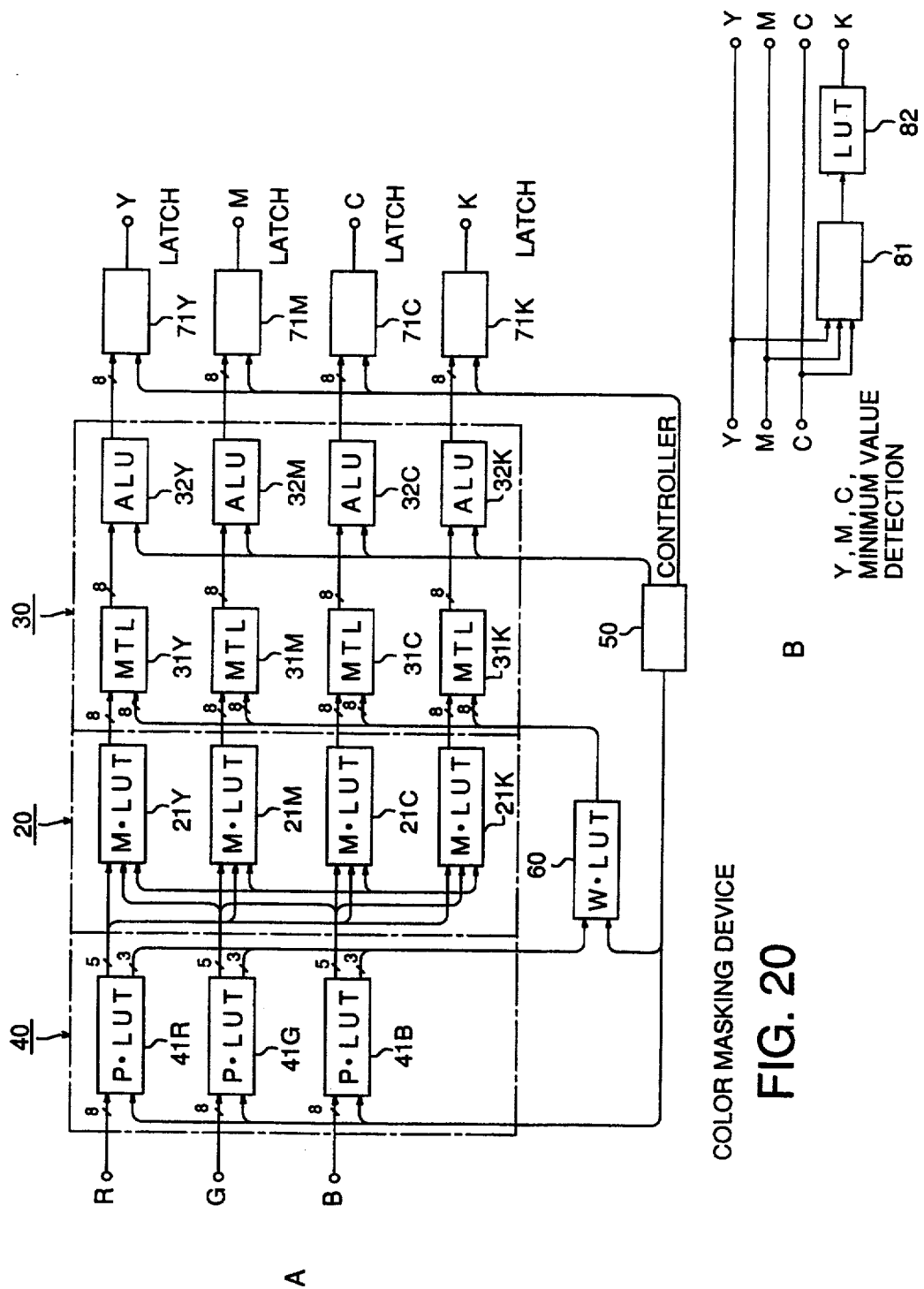
Figure 21:
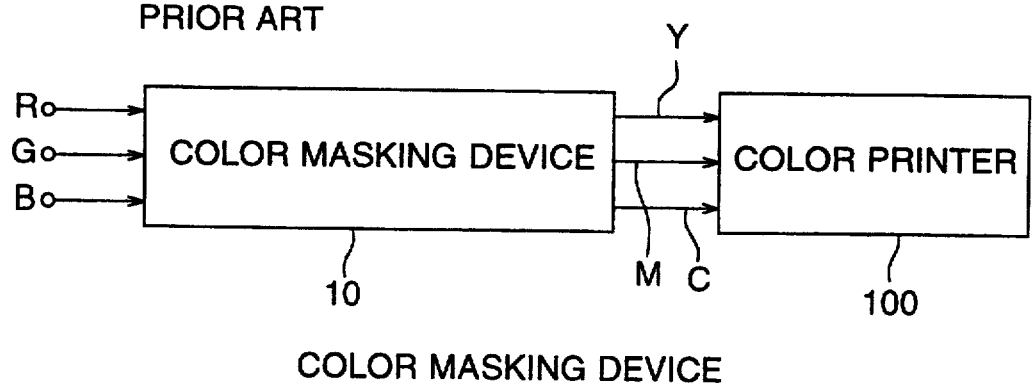
FIGS. 21 and 22 are illustrations for the conventional method.
Figure 22:
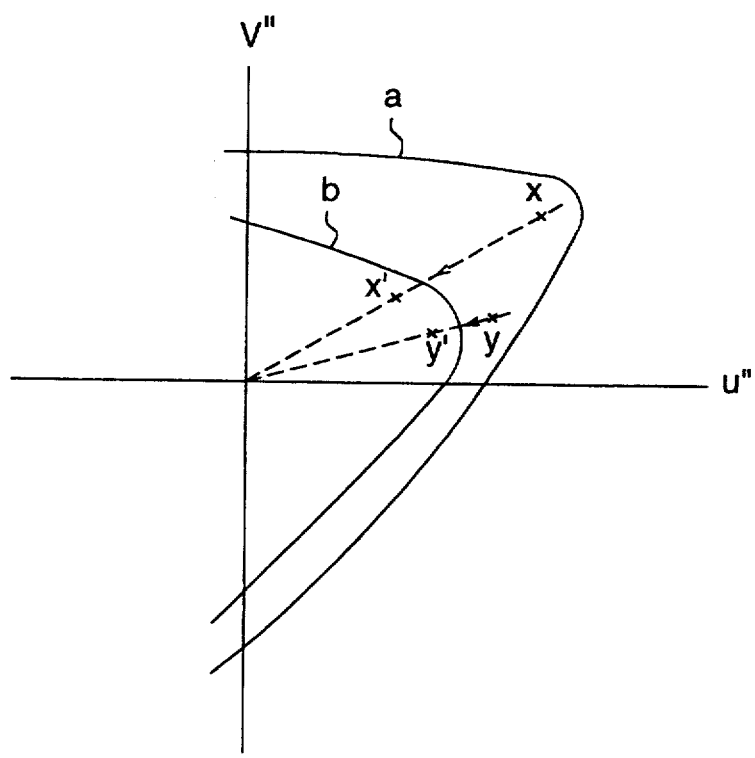

FIG. 20 shows an example that behind a color masking device (A in the drawing) for outputting Y, M, and C image data without K image data being stored in the lookup table beforehand, a device (B in the drawing), which obtains K image data from Expression (1) and outputs it, is added. In this example, the memory capacity can be decreased. The parts shown in FIG. 20 which correspond to those shown in FIG. 19 are assigned with the same numbers and the detailed description is omitted.

In FIG. 20, Y, M, and C image data outputted from the latch circuits 71Y to 71C are supplied to a minimum value detection circuit 81, and the minimum value among Y, M, and C, that is, min[Y, M, C] is detected. Detected min[Y, M, C] is supplied to a lookup table 82, and the lookup table 82 outputs K image data which is obtained from the following relational expression.

$$K = 1.6 \times (\min [Y, M, C] - 128)$$

where, when $K < 0$, $K = 0$.

According to the present invention, as described above, as to the lightness direction, L* among the values of the colorimetric system obtained for each combination of the input color component image information is converted according to the ratio of the lightness range of the input side color gamut on the lightness axis to that of the output side color gamut, and the lightness of the input side color gamut is compressed and mapped. As to the chroma direction, no value is corrected at the overlapped center portion of the color reproduction gamut of the input side and that of the output side. In the peripheral area, u* and v* or a* and b* among the values of the colorimetric system obtained for each combination of the input color component image information are converted according to the chroma range of the two color gamuts and the chroma of the input side color gamut is compressed and mapped.

Therefore, the color reproduction gamut of the input side is included in the color reproduction gamut of the output side by a natural conversion result, and the color reproduction obtained by the output color component image information becomes natural.

When u* and v* or a* and b* are converted, for example, in a high lightness area and the chroma is compressed and mapped, the decrease amount of chroma is suppressed. Therefore, decreases in color saturation by compression and mapping, for example, in a high lightness or chroma area can be surpressed.

When the chroma of the input side color gamut is compressed and mapped, the hue is moved so that the peak of each color of the input side color gamut moves toward the peak of the corresponding color of the output side color gamut. Therefore, the color reproduction gamut on the input side is included in the color reproduction gamut on the output side by natural conversion with the entire chroma balance kept, the color reproduction obtained by the output color component image information provides satisfactory lightness and chroma, and the chroma is well balanced as a whole.

What is claimed is:

1. A method for compressing color image data of a first media to be reproduced on a second media having a color reproducing capability larger than that of the first media, comprising:

obtaining a first color gamut on a colorimeter system on the basis of a plurality of color image data of the first media beforehand, the colorimetric system being one of the CIE standard L*u*v* and L*a*b* colorimetric systems;

obtaining a second color gamut on the colorimetric system on the basis of a plurality of color image data of the second media beforehand;

calculating a first lightness difference between maximum and minimum values of the lightness on a lightness axis of the first color gamut, a second lightness difference between maximum and minimum values of lightness on the lightness axis of the second color gamut, and a lightness deference ratio between the first and the second lightness differences;

inputting a color image data "T" of the first media;

converting the L* value of the color image data "T") of the first media on the basis of the lightness difference ratio;

comparing a chroma "rT" of the color image data "T" of the first media with a threshold value which is "a" (a<1.0) times a maximum chroma "r2max" of the first color gamut at a lightness "LT" and a hue "theta T" of the color image data "T"; and in the case that the chroma "rT" is not larger that the threshold value, using the u* and v* values or a* and b* values of the color image data "T" without any change, or in the case that the chroma "rT" is larger than the threshold value, assuming a first region enclosed between the inner gamut surface which comprises a value which is "a" times of the maximum chroma value at the each of the hue and lightness of the second color gamut and the outer surface of the first color gamut which comprises the maximum chroma value at the each of the hue and the lightness of the first color gamut, and a second region enclosed between the inner gamut surface above mentioned and the outer surface of the second color gamut which comprises the maximum chroma value of each of the hue and the lightness of the second color gamut; and converting the u* and v* values or the a* and b* values of the color image data "T" so as to make the first region in continuous adoption with the second region;

wherein when the chroma "rT" decreases and the hue "theta T" locates within one of predetermined regions each neighboring the hue at the maximum chroma of each of blue, green, red, yellow, magenta and cyan in the first color gamut, the hue "theta T" is moved in a direction toward the hue at the maximum chroma of the same color of the second color gamut.

2. A method for compressed color image data of a first media to be reproduced on a second media having a color reproducing capability larger than that of the first media, comprising:

obtaining a first color gamut on a colorimetric system on the basis of the plurality of color image data of the first media beforehand, the colorimetric system being one of the CIE standard L*u*v, and L*a*b* colorimetric systems;

obtaining a second color gamut on the colorimetric system on the basis of a plurality of color image data of the second media beforehand;

calculating a first lightness difference between maximum and minimum values of the lightness on a lightness axis of the first color gamut, a second lightness difference between maximum and minimum values of lightness on the lightness axis of the second color gamut, and a lightness deference ratio between the first and the second lightness differences;

inputting a color image data "T" of the first media;

converting the L* value of the color image data "T" of the first media on the basis of the lightness difference ratio;

comparing a chroma "rT" of the color image data "T" of the first media with a threshold value which is "a" (a<1.0) times of a maximum chroma "r2max" of the first color gamut at a lightness "LT" and a hue "theta T" of the color image data "T"; and in the case that the chroma "rT" is not larger than the threshold value,
using the u* and v* values or a* and b* values of the color image data "T" without any change, or in the case that the chroma "rT" is larger than the threshold value,
assuming a first region enclosed between the inner gamut surface which comprises a value which is "a" times of the maximum chroma value at the each of the hue and lightness of the second color gamut and the outer surface of the first color gamut which comprises the maximum chroma value at the each of the hue and the lightness of the first color gamut, and a second region enclosed between the inner gamut surface above mentioned and the outer surface of the second color gamut which comprises the maximum chroma value of each of the hue and the lightness of the second color gamut; and converting the u* and v* values or the a* and b* values of the color image data "T" so as to make the first region in continuous adoption with the second region;

wherein when the chroma "rT" decreases and the hue "theta T" locates within one of predetermined regions each neighboring the hue at the maximum chroma of each of three primary colors of the first color gamut, the hue "theta T" is moved in a direction toward one of two hues which short distance from the above mentioned hue, at the maximum chroma of the three primary colors of the second color gamut.

3. A method of compressing color image data of a first media to be produced on a second media, the first media having a first color gamut on a colorimetric system larger than that of the second media, said method comprising the steps of:

calculating a first lightness difference "ΔL1" between maximum and minimum lightness in the first color gamut, a second lightness difference "ΔL2" in the second color gamut, and a lightness difference ratio "ΔL2/ΔL1" between the first and second lightness differences;

inputting image data of the first media;

compressing the lightness of the image data on the basis of the lightness difference ratio "ΔL2/ΔL1";

selecting a line, represented by the equation "L=br+c", passing at a point of the image data on a cross section in the first and second color gamuts, wherein the cross section has the same hue and represents a relation between lightness and chroma, "L" is lightness, "r" is chroma, and "b" and "c" are coefficients;

changing the value of "b" and "c" depending on the value of "L";

obtaining the maximum chroma "r1max" in the first gamut on the selected line the maximum chroma "r2max" in the second gamut on the selected line and the chroma ratio "r2max/r1max";

compressing the chroma of the image data on the basis of the chroma ratio "r2max/r1max" when the image data chroma is larger than a threshold value and determining the values and "c" so that the compressed amount of the chroma is minimized; and further correcting the lightness of the image data in accordance with the compressed amount of the chroma when the determined value of "b" is not 0.0.

4. The method of claim 3, wherein b is smaller than 0.0 on the high lightness region in the color gamut.

5. The method claim 3, wherein b is smaller than 0.0 on the low lightness region in the color gamut.

6. The method of claim 3, wherein b is changed in such manner that b>0.0 in the high lightness region, b=0.0 in the middle lightness region, and b<0.0 in the low lightness region in the color gamut.

7. The method of claim 3, wherein a threshold value of chroma is obtained by multiplying the maximum chroma "r2max" in the second gamut with coefficient "a" (a<1.0), omitting said chroma compressing step when the chroma of the image data is smaller than the threshold value, and when the chroma of the image data is larger than the threshold value, the first chroma difference between the maximum chroma "r1max" in the first color gamut and the threshold value, the second chroma difference between the maximum chroma "r2max" in the second color gamut and the threshold value, and the chroma difference ratio between the first and second chroma differences are calculated, the chroma difference ratio is used instead of the chroma ratio for compressing the chroma of the image data.

8. The method of claim 7, wherein b is larger than 0.0 on the high lightness region in the color gamut.

9. The method of claim 7, wherein b is smaller than 0.0 on the low lightness region in the color gamut.

10. The method of claim 7, wherein b is changed in such manner that b>0.0 in the high lightness region, b=0.0 in the middle lightness region, and b<0.0 in the low lightness region in the color gamut.

* * * * *

UNITED STATES PATENT AND TRADEMARK OFFICE
CERTIFICATE OF CORRECTION

PATENT NO. : 5,363,218            Page 1 of 2
DATED : November 08, 1994
INVENTOR(S) : Toru Hoshino It is certified that error appears in the above-indentified patent and that said Letters Patent is hereby corrected as shown below:

Claim 1, Column 22, Line 31, delete ")".

Claim 1, Column 22, Line 36, after "times" insert --of--.

Claim 1, Column 22, Line 39, change "that" (second occurrence) to --than---.

Claim 2, Column 23, Line 6, change "the" (second occurrence) to --a--.

Claim 3, Column 23, Line 65, change "produced" to --reproduced--.

Claim 4, Column 24, Line 35, change "smaller" to --larger--.

UNITED STATES PATENT AND TRADEMARK OFFICE
CERTIFICATE OF CORRECTION

PATENT NO. : 5,363,218

DATED : November 8, 1994

INVENTOR(S) : Toru Hoshino

It is certified that error appears in the above-indentified patent and that said Letters Patent is hereby corrected as shown below:

Claim 7, Column 24, line 55, after "calculated" insert —and—.

Signed and Sealed this

Sixteenth Day of May, 1995

Attest:

BRUCE LEHMAN

Attesting Officer     Commissioner of Patents and Trademarks